US 11,338,447 B2

(12) United States Patent
Reilly et al.

(10) Patent No.: US 11,338,447 B2
(45) Date of Patent: May 24, 2022

(54) STRUCTURAL LOAD CELL CASES FOR ENCASING SENSORS IN ROBOTIC SYSTEMS

(71) Applicant: XYZ Robotics Inc., Natick, MA (US)

(72) Inventors: Michael Coreth Reilly, Boston, MA (US); Kuan-Ting Yu, Natick, MA (US)

(73) Assignee: XYZ Robotics Global Inc., Grand Cayman (KY)

( * ) Notice: Subject to any disclaimer, the term of this patent is extended or adjusted under 35 U.S.C. 154(b) by 0 days.

(21) Appl. No.: 17/385,234

(22) Filed: Jul. 26, 2021

(65) Prior Publication Data

US 2022/0001551 A1 Jan. 6, 2022

Related U.S. Application Data

(63) Continuation of application No. PCT/US2021/140278, filed on Jul. 2, 2021.

(60) Provisional application No. 62/705,593, filed on Jul. 6, 2020.

(51) Int. Cl.
*B25J 13/08* (2006.01)
*B25J 9/14* (2006.01)

(52) U.S. Cl.
CPC .............. *B25J 13/085* (2013.01); *B25J 9/14* (2013.01)

(58) Field of Classification Search
CPC ........... B25J 13/085; B25J 9/14; A61B 34/20; A61B 34/30
USPC .................................................. 73/862.541
See application file for complete search history.

(56) References Cited

U.S. PATENT DOCUMENTS

| 6,655,219 | B2 | 12/2003 | Saitoh et al. |
| 7,614,311 | B2* | 11/2009 | Kahle ................... G01F 1/8454 |
| | | | 73/861.353 |
| 8,698,014 | B1 | 4/2014 | Walstad |
| 9,789,603 | B2 | 10/2017 | Jacobsen et al. |
| 9,999,913 | B2* | 6/2018 | Alañcu Gómez .... B21D 39/023 |
| 2011/0219886 | A1* | 9/2011 | Wickens ................. F16C 25/06 |
| | | | 73/862.55 |

(Continued)

FOREIGN PATENT DOCUMENTS

| EP | 2438318 B1 * | 8/2015 | ............ F16C 19/522 |
| JP | 3383530 B2 * | 3/2003 | |
| JP | 5329308 B2 | 10/2013 | |

(Continued)

OTHER PUBLICATIONS

Interface Inc., "Load Cells Selection Guide," 2007, pp. 1-152 Available at: https://www.nbn-elektronik.ch/shop/files/Interface_Katalog_2007.pdf.

*Primary Examiner* — Octavia Hollington
(74) *Attorney, Agent, or Firm* — American Patent Agency PC; Daniar Hussain; Stephen M. Hou

(57) ABSTRACT

A structural load cell case for a pick and place robotic system that prevents torsion, bending, and overloading from damaging sensors is disclosed. The structural load cell case includes a base, an inner tube that houses the load cell, and a roller sleeve outside the inner tube. The base is adapted to connect to a load and includes a compression spring interfaced with a first part of the load cell. The roller sleeve includes a plurality of roller bearings in contact with the inner tube. The inner tube is free to slide along an axis of the roller sleeve up to pre-determined limits, but is constrained from rotating or translating in directions other than the axis of the roller sleeve.

20 Claims, 38 Drawing Sheets

(56) References Cited

U.S. PATENT DOCUMENTS

2020/0063793 A1* 2/2020 Rossberger .......... F16C 35/077

FOREIGN PATENT DOCUMENTS

| JP | 2016087785 A | 5/2016 |
| KR | 101722986 B1 * | 4/2017 |

* cited by examiner

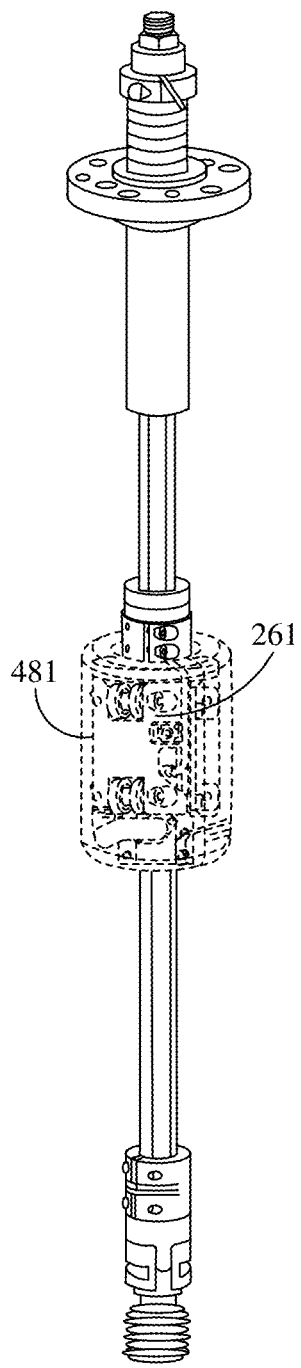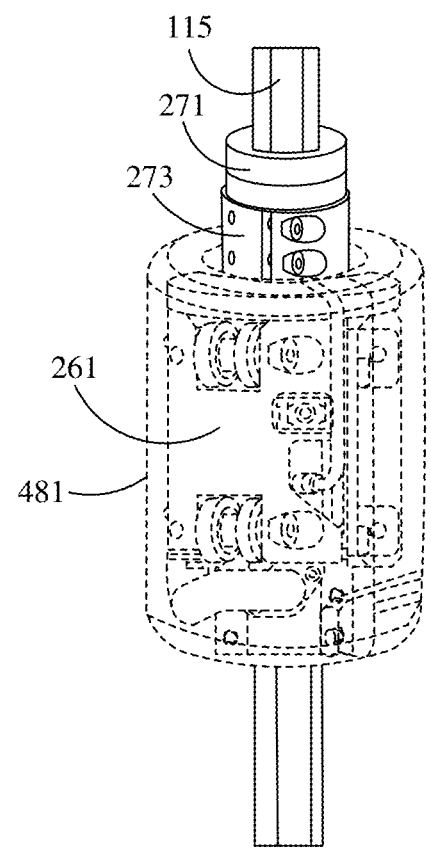
*FIG. 2F*  *FIG. 2G*

360

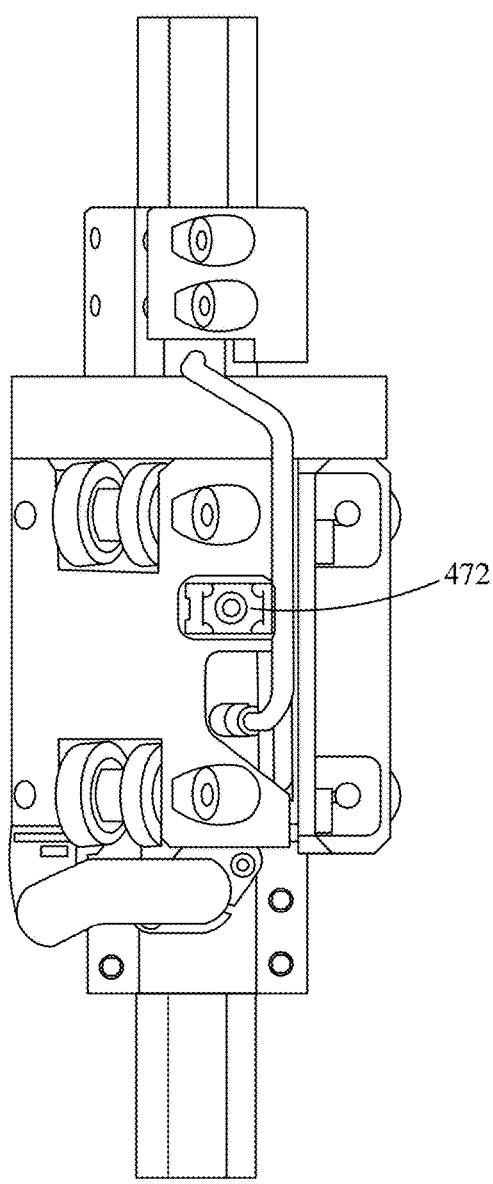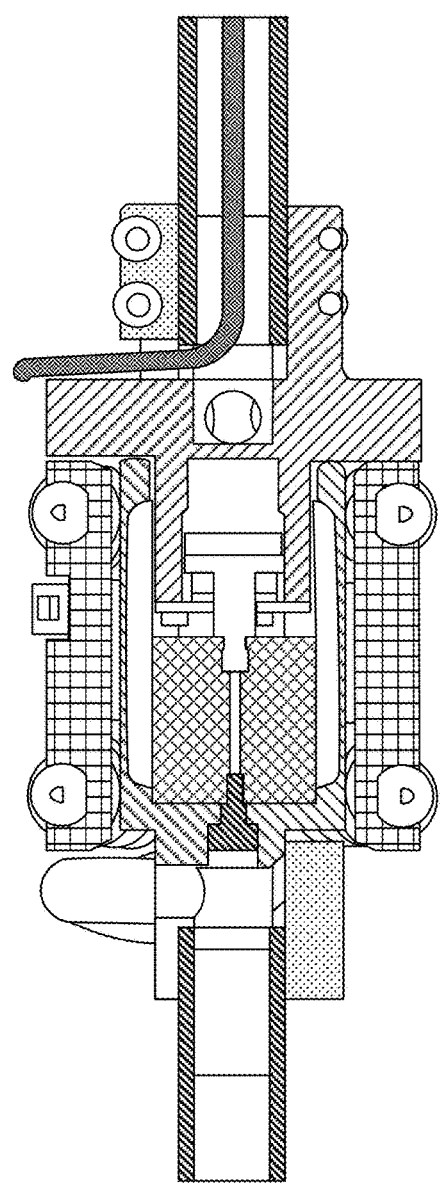
*FIG. 4H*  *FIG. 4J*

STRUCTURAL LOAD CELL CASES FOR ENCASING SENSORS IN ROBOTIC SYSTEMS

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

FIELD OF THE INVENTION

Embodiments of the present invention are in the field of robotic systems that use artificial intelligence, computer vision, and/or mechanical systems to perform pick and place applications, and pertain particularly to structural load cell cases for encasing sensors in a robotic system.

BACKGROUND OF THE INVENTION

The statements in the background of the invention are provided to assist with understanding the invention and its applications and uses, and may not constitute prior art.

There are several approaches that have been used to incorporate sensors into robotic systems (e.g., pick and place robotic systems) to pick objects and measure various object properties and states, such as weight and dimensions. These sensors may be, for example, load cells, which are force sensors that convert a force into an electrical signal that can be detected and measured to weigh the picked objects. However, many of these approaches either do not prevent torsion, bending, and compression from damaging the load cell, are too bulky to be used in a cluttered container, work only within a narrow range of load weights and risk damage otherwise, are affected by compressed air or vacuum, or are unreliable.

Therefore, it would be an advancement in the state of the art to provide a structural load cell case to house a load cell in a robotic system that is mechanically robust and compact, is suitable for a wide variety of loads by limiting transferred forces, is unaffected by compressed air or vacuum, and prevents torsion, bending, and compression from damaging the load cell. Incorporating such a structural load cell case along with a load cell would be beneficial for a variety of applications, such as load weighing, double pick detection, system adjustment in response to load weight, and implementing a limit switch for object presence detection. It may also be used to maintain a pull or push force during an assembly.

It is against this background that the present invention was developed.

BRIEF SUMMARY OF THE INVENTION

The present invention relates to a structural load cell case for robotic pick and place systems. More specifically, in various embodiments, the structural load cell case is adapted for housing a load cell, the load cell for measuring a force along a force axis. The structural load cell case includes a base, an inner tube that houses the load cell, and a roller sleeve. The base is adapted to connect to a load at a distal end of the force axis, and includes a flexible joint connected with a first part of the load cell. The inner tube that houses the load cell is along the force axis. The roller sleeve is along the force axis, sits outside the inner tube, and includes a plurality of roller bearings in contact with the inner tube. The inner tube is adapted to slide along the force axis, but is constrained from rotating or translating in directions other than the force axis.

In some embodiments, the flexible joint is a compression spring.

In some embodiments, the inner tube further includes an adapter plate to secure a second part of the load cell to the inner tube.

In some embodiments, the structural load cell case further includes a plurality of pneumatic fittings and an external flexible tube. A first pneumatic fitting of the plurality of pneumatic fittings connects the inner tube to a top tube. The first pneumatic fitting channels to a second pneumatic fitting of the plurality of pneumatic fittings on the inner tube via the built-in air channel, which connects to a first end of the external flexible tube. A second end of the external flexible tube connects to a third pneumatic fitting of the plurality of pneumatic fittings on the base. The third pneumatic fitting channels to a fourth pneumatic fitting of the plurality of pneumatic fittings. The fourth pneumatic fitting connects the base to a bottom tube.

In some embodiments, the inner tube includes a built-in air channel adapted for carrying a fluid.

In some embodiments, the structural load cell case further includes an internal air channel fluidly connected to the built-in air channel and a flexible air fitting fluidly connected to the internal air channel.

In some embodiments, the inner tube further includes a manifold plate that houses the built-in air channel.

In some embodiments, the inner tube has a non-circular cross-sectional shape.

In some embodiments, the non-circular cross-sectional shape is a hexagon.

In some embodiments, the plurality of roller bearings slide along a wall of the inner tube.

In some embodiments, the structural load cell case further includes a spacer between a pair of the plurality of roller bearings on a shared shoulder.

In some embodiments, the roller sleeve further includes a wheel bracket.

In some embodiments, a subset of the plurality of roller bearings roll together and are on a shared shoulder screw affixed to the roller sleeve.

In some embodiments, the structural load cell case limits a force transferred to the load cell to a pre-determined limit.

In various embodiments, the present invention is a robotic system that includes a structural load cell case to encase a load cell. The load cell is adapted for measuring a force along a force axis. The structural load cell case includes a base, an inner tube that houses the load cell, and a roller sleeve. The base is adapted to connect to a load at a distal end of the force axis, and includes a flexible joint connected with a first part of the load cell. The inner tube that houses the load cell is along the force axis. The roller sleeve is along the force axis, sits outside the inner tube, and includes a plurality of roller bearings in contact with the inner tube. The inner tube is adapted to slide along the force axis, but is constrained from rotating or translating in directions other than the force axis.

In some embodiments, the flexible joint is a compression spring.

In some embodiments, the inner tube further includes an adapter plate to secure a second part of the load cell to the inner tube.

In some embodiments, the inner tube includes a built-in air channel adapted for carrying a fluid.

In some embodiments, the structural load cell case further includes an internal air channel fluidly connected to the built-in air channel and a flexible air fitting fluidly connected to the internal air channel.

In some embodiments, the inner tube further includes a manifold plate that houses the built-in air channel.

Other aspects and embodiments of the present invention include the methods and processes comprising the steps described herein, and also include the processes and modes of operation of the systems and devices described herein.

Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive.

Embodiments will now be described, by way of examples, with reference to the accompanying drawings, in which:

FIG. 2F shows a see-through view of an exemplary structural load cell case in the context of the end effector of a robotic system, in accordance with one embodiment of the invention.

FIG. 2G shows a see-through view of an exemplary structural load cell case connected to a tube of an end effector of a robotic system, in accordance with one embodiment of the invention.

FIG. 4H, which shows an assembled view of some components of an example structural load cell case for a robotic system undergoing assembly, in accordance with one embodiment of the invention.

FIG. 4J shows a cutaway view of some components of an example structural load cell case for a robotic system undergoing assembly, in accordance with one embodiment of the invention.

DETAILED DESCRIPTION OF THE INVENTION

Overview

With reference to the figures provided, embodiments of the present invention are now described in detail.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Context of the Structural Load Cell Case within a Robotic System

Figure 1A:
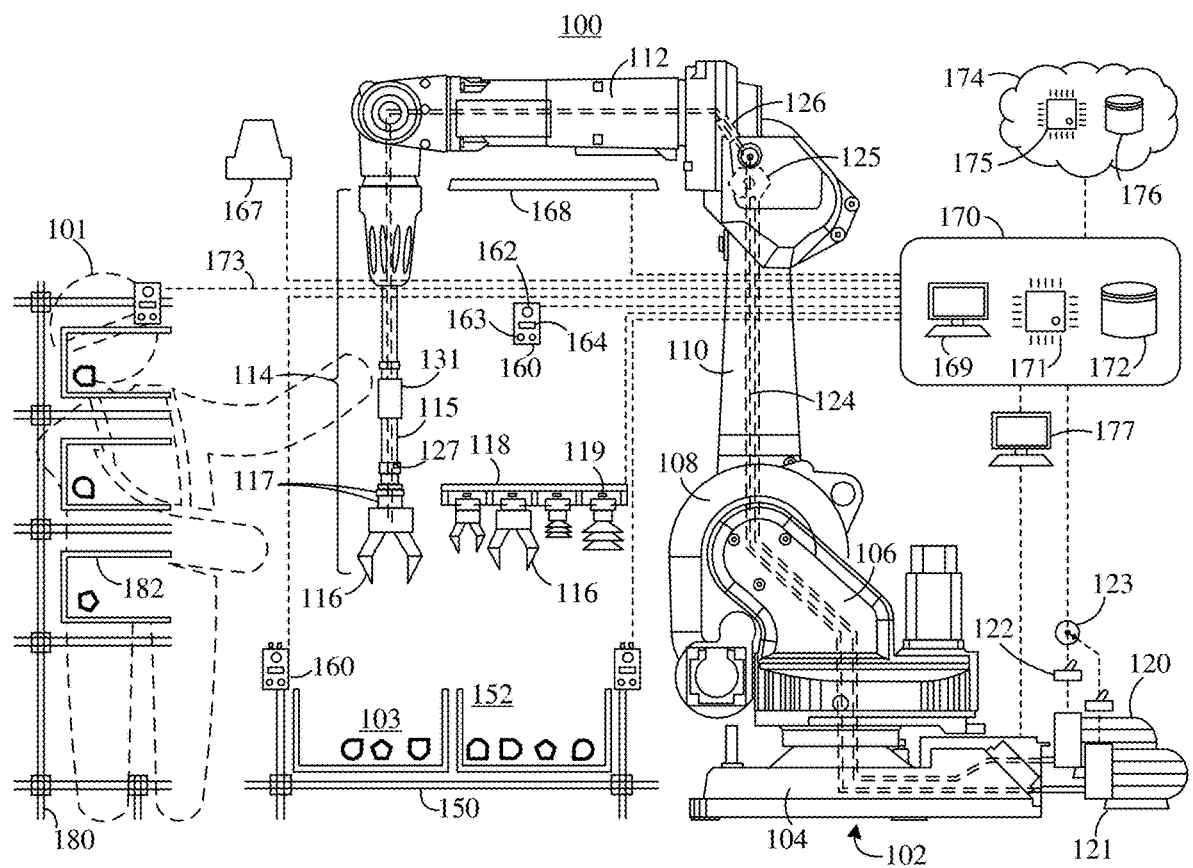
FIGS. 1A, 1B, and 1C show exemplary robotic systems in accordance with some embodiments.
Figure 1B:
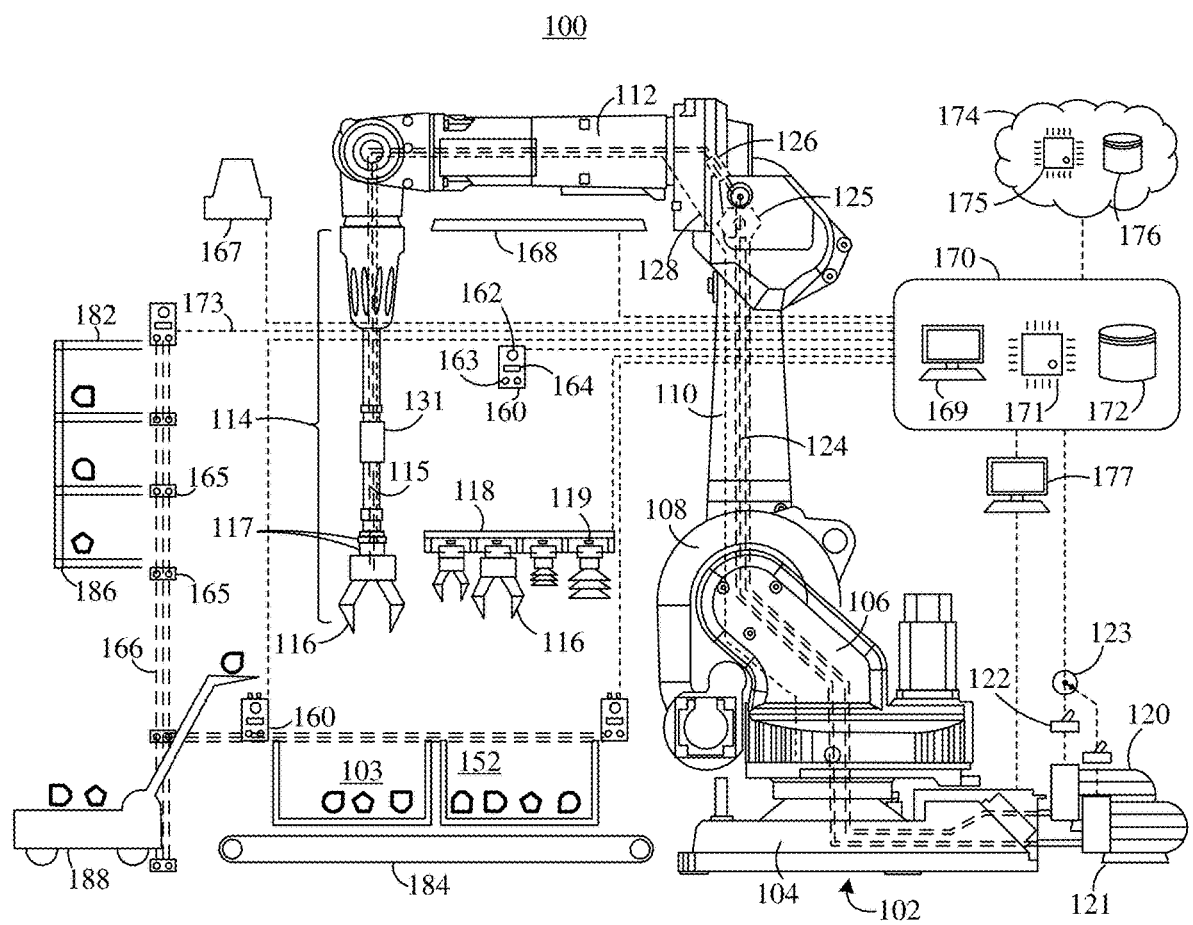
Figure 1C:
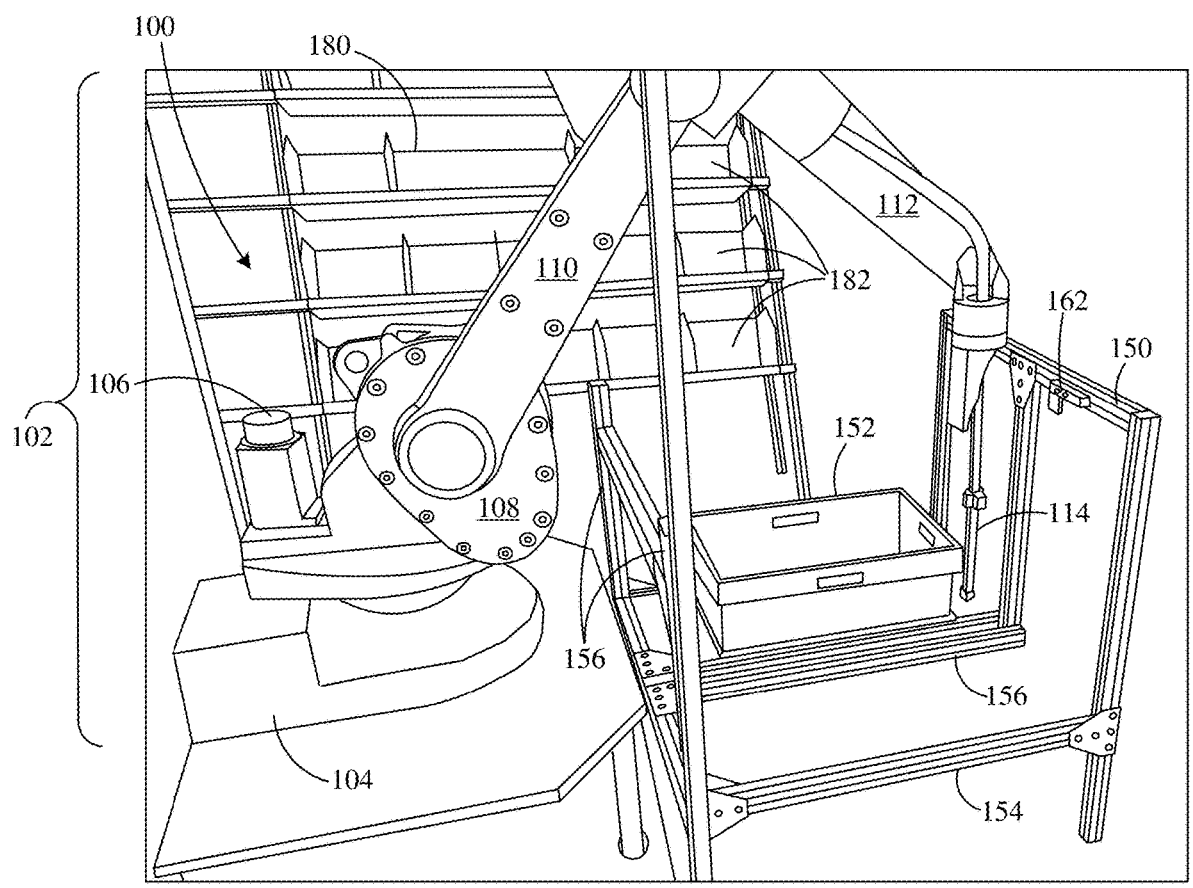

FIGS. 1A, 1B, and 1C show an exemplary robotic system 100 according to some embodiments of the present technology. The robotic system 100 is configured to manipulate a wide variety of objects 103 including novel objects that the system has not previously picked, placed, or even identified. In some embodiments, the robotic system is a pick, sort, and place robotic system.

In some embodiments, robotic system 100 includes an end effector, which further includes a tool that manipulates objects. In some embodiments, the end effector and the tool remain stationary relative to the robotic system while an object's position is controlled. For example, the robotic system may alter the slope or other characteristics of the surface on which the object is sitting to slide it into a stationary tool, such as a gripper or a suction.

In other embodiments, the end effector and the tool are attached to a motion device, such as a moveable robotic arm 102. The tool may include, for example, a knife that may slice or poke an object, a key that may open a lock, or a center punch that may mark a plate. In some embodiments, the tool is useful in a pick, sort, and place robotic system. Such tools may include grippers and suctions. Although the description below discloses tools and related systems for pick, sort, and place robotic systems, embodiments useful for other types of tools are readily apparent to those skilled in the art.

Pick, sort, and place robotic system 100 includes a robotic arm 102, various input and output components and structures such as a sorting stand 150 and a receptacle stand 180. An operator 101 may supervise or assist the robotic arm (see FIG. 1A). In some cases, the sorting stand 150 and/or receptacle stand 180 are replaced by or include a conveyor 184, a put wall 186, and/or an automated guided vehicle (AGV) 188, as shown in FIG. 1B. The robotic arm 102 identifies objects 103 from tote 152 in sorting stand 150, picks the objects, and places the gripped objects at locations in receptacle stand 180 (e.g., bins 182). As shown in FIG. 1C, sorting stand 150 may include support structure 154, which is a system of metal support members bolted together. The side of support structure 154 opposite to robotic arm 102 may include an opening allowing a tote (e.g., tote 152) or other receptacle to be inserted into sorting stand 150. Sorting stand 150 optionally includes base 156 for supporting receptacles.

Pick, sort, and place robotic system 100 also includes a control system 170 to monitor and manage robot motion. The control system provides instructions and/or command signals for moving (e.g., rotating, extending, retracting) the various components of robotic arm 102. The control system 170 includes a processor 171, memory 172 (e.g., a non-transitory computer-readable storage medium), data links 173, communications interfaces, and other components. The control system may also include an optional cloud component 174 with processors 175 and databases 176 accessible over a local or remote network (e.g., Internet).

Pick, sort, and place robotic system 100 also includes a vision system with a vision processor 169, sensor devices 160, and other components. Each sensor device 160 may have one or more cameras 162, a variety of sensors 163 (e.g., image, depth, visible light, and/or infrared sensors), barcode readers 164, or other components. In some cases, cameras 162 capture image data that includes visible light data (e.g., RGB data) and/or depth information (e.g., how far objects in the image are from the camera). The captured image data is sent to the control system for processing. The vision system can have any number of sensors and cameras. Its components can be supported by any robotic, input/output component or structure, and be located in other locations.

Pick, sort, and place robotic system 100 also includes a motion controller 177. The vision processor 169 and motion controller 177 may be external or located within the control system 170. FIGS. 1A and 1B, for example, show an external motion controller 177 and a vision processor 169 that is located within the control system.

Pick, sort, and place robotic system 100 may also include a light curtain system comprising multiple sensors 165 generating a light curtain 166. Pick, sort, and place robotic system 100 may also include a LIDAR 167. The light curtain system and the LIDAR may be used either for safety purposes (e.g., monitor human movement around the robotic system) or for operations (e.g., detect the movement of objects or system components). Pick, sort, and place robotic system 100 may also include lighting devices 168 that can be dimmed depending on tote color or other environmental and operational factors.

Robotic arm 102 includes base 104 for mounting to a support surface (e.g., the floor or some other support structure). Frame 106 is rotatably connected to base 104. Lower arm 108 is rotatably connected to frame 110. Upper arm 112 is rotatably connected to lower arm 108. End effector 114 is rotatably connected to upper arm 112. End effector 114 includes one or more tools 116 as well as a tube 115. The end effector 114 and each tool 116 have tool changer 117 parts allowing various tools to be compatible with the end effector 114. A tool rack 118 is used for storing and accessing the various tools. Each tool slot on the tool rack 118 has a tool sensor 119 to indicate the presence or absence of a tool. FIGS. 1A and 1B show multiple gripping and suction tools such as fingered grippers and suction tools of various sizes. In the case of FIG. 1, gripper 116 is a pneumatic gripper. Other grippers, such as gripping fingers or other types of suction grippers can also be used. In some cases, end effector 114 is compliant and/or multi-purpose.

Pick, sort, and place robotic system 100 may also include a vacuum source 120 (e.g., pump) or compressed air source 121 to provide the pressure necessary to use the tools, where vacuum denotes negative pressure and compressed air denotes positive pressure. Each source is controlled by a source switch 122 operable by the control system. A source selection switch 123 allows the control system to select the adequate source to operate the tool that is currently in use. A hose 124 runs through the robotic arm from the end effector to the source. A valve 125 allows the control system to select a pressure source, or to connect the hose to the atmosphere (i.e., no positive or negative pressure applied). A pressure sensor 126 allows the control system to monitor the pressure level within the hose. A component of a tool changer 127 permits efficient and reliable tool-changing. A weight sensor 131 located on the end effector allows the control system to monitor the weight of the tool and its load (see FIG. 1A). In some embodiments, a tool wire 128 running from the end effector to the base or to the frame of the robotic arm allows the control system to determine whether a tool is attached to the end effector.

All components of the control system 170 and vision system (e.g., cameras and sensors), are connected through data links 173. Furthermore, all components of the robotic system involved in motion or monitoring (e.g., motion controller 177, pump/selection switches 122/123, valve 125, pressure sensor 126, tool sensors 119, lighting devices 168) have data links 173 to the control system 170.

When the robotic system picks up a load using an end effector 114 attached with a load cell, the load cell detects the load's weight, by acting as a transducer that converts the gravitational force of the load, i.e., its weight, applied onto the load cell into an electrical output that the robotic system collects. However, most commercially available load cells are designed to handle and measure force in one dimension only. When the load cell is subjected to forces in other directions, the resulting torsion or bending may damage the load cell and distort the weight measurement.

In robotic pick and place applications, after a load is picked or moved, it may continue to swing side-to-side or rotationally due to inertia, especially when a robotic arm undergoes high acceleration or deceleration in various directions. Such acceleration and deceleration are typical in order to perform efficient pick and place tasks. There are also impacts between the tube, the object, and environment.

To insulate the load cell from these additional forces, the load cell is encased in a structural load cell case resistant to torsional and bending forces to ensure the mechanical robustness for long-term usage. Such a structural load cell case allows free and low-friction movement of some components in order to preserve the accuracy of the weight measurement while not damaging the load cell.

Relatedly, prior art designs may not limit the forces transferred from a load to a load cell. The structural load cell case disclosed herein is configured to limit the maximum positive force (e.g., a pull) or maximum negative force (e.g., a push) measured by the load cell, which protects the load cell from force exertion beyond its acceptable limits. Prior art structural load cell cases also do not take into account a positive pressure (e.g., compressed air) or a negative pressure (e.g., a vacuum) applied to an end effector, which affects the measured load. In contrast, the structural load cell case disclosed herein eliminates any effects of fluid pressure applied to a pick-and-place tool on the load cell measurement.

Finally, for a variety of sensors, it is very difficult for the user to obtain accurate readings in a dynamic environment. Typically, such load cells have drawbacks, such as sensitivity to noise, low precision resulting from the long distance to the load, and lack of resilience to long-term repeated use. The structural load cell case described in this disclosure includes a system designed to address these drawbacks. Although it may require calibration whenever installed in a customized system comprising an end effector, use of the structural load cell case save time in the long run by being able to take repeated weight measurements for load quickly and resiliently, and without interrupting the motion of the robotic arm, which saves the overall operation time. The structural load cell case thus provides a robust solution for weighing picked objects during pick-and-place operations while maintaining a high resistance to side-loads, moment loads, torsion loads, and excessive compression loads.

Interaction Between System Components

In some embodiments, the pick and place robotic system includes a robotic arm with an end effector configured to have an attached tool at its distal end; a tool changing device; a tool rack; a vision system; and a control system. The tool changing device further includes a robotic arm attachment portion and a tool attachment portion. The tool rack includes one or more tool plates and a plurality of tools. The control system includes a processor, a non-transitory computer-readable storage medium, and a plurality of communication interfaces.

In some embodiments, at least one tool includes a tool attachment portion of the tool changing device at its proximal end. The robotic arm attachment portion is configured to attach to the tool attachment portion, and at least one tool plate of the one or more tool plates includes a tool slot.

In some embodiments, each tool plate has exactly one tool slot. In other embodiments, a tool plate may have more than one tool slot. In one embodiment, the tool rack further includes one or more sensors associated with a tool slot, where the one or more sensors are configured to indicate the presence of a tool in the tool slot.

In one embodiment, the control system receives data from each of the sensors on the tool rack and can determine, at any time, whether a given tool is located at its slot in the tool rack.

In yet another embodiment, the tool attachment portion further includes a plurality of grooves, and the plurality of grooves spatially corresponds to a tool slot on a tool plate.

The grooves enable tools to slide into the tool rack and to be retrieved from the tool rack in a robust and timely manner.

In one embodiment, the pick and place robotic system further includes a weight sensor at the distal end of the end effector, where the weight sensor is configured to measure the weight of an attached tool and its load (e.g., one or more objects).

A weight sensor may allow the control system to detect the presence or absence of a tool, the number of objects carried by it.

In one embodiment, the pick and place robotic system further includes an electric circuit, where the electric circuit is configured to indicate the presence of a tool attached to the end effector. In one embodiment, the electric circuit is a tool wire.

A tool wire may be configured to be in contact with a tool when a tool is attached to the end effector so as to convey to the control system whether a tool is attached. In one embodiment, the presence of a tool is determined electrically (e.g., through detecting a change in wire impedance, current intensity, voltage, etc.).

In one embodiment, the tool wire is run from the tool, through the pass-through end effector tube, to a proximal part of the robotic arm such as its base or its frame, where the information is conveyed to the control system through a data link.

In some embodiments, the pick and place robotic system further includes a plurality of input and output components, where at least one output component corresponds to an object type, and where the plurality of input and output components are selected from the group consisting of a sorting stand, a tote, a receptacle stand, a bin, a tote conveyor, an object conveyor, a put wall, an automated guided vehicle (AGV), and a shelf.

Objects may be classified by type. Object types may involve their shape (e.g., round vs. elongated objects), the material they are made of (e.g., plastic vs. metal objects), their color, or their nature (e.g., fruits vs. vegetables, apples vs. oranges). In one embodiment, objects having the same barcode or the same destination (e.g., shipping address, destination department in an office or plant, etc.) belong to the same object type. In one embodiment, objects belonging to the same order (e.g., they have the same order number) belong to the same object type. In one embodiment, each of the various output components (e.g., the bins in a sorting stand) are associated with distinct object types.

In some embodiments, the robotic arm and tool attachment portions further comprise a through-hole. In some embodiments, the through-hole transmits vacuum or compressed air between an attached tool and its corresponding source pump. In some embodiments, the through-hole includes a mechanical pass-through. In some embodiments, the through-hole includes an electrical pass-through. In further embodiments, the robotic arm and tool attachment portions comprise a plurality of through-holes, each of which may be any of the aforementioned types.

In one embodiment, the pick and place robotic system further includes a first hose, where the through-hole of the robotic arm attachment portion is connected to a distal end of the first hose.

In one embodiment, the pick and place robotic system further includes a pressure sensor, where the pressure sensor is located on the first hose. Data from the pressure sensor (e.g., a pressure reading) may indicate the presence or absence of an attached tool or a picked object.

In one embodiment, the pick and place robotic system further includes a source pump, where the source pump is connected to the proximal end of the first hose, and the source pump is selected from the group consisting of a vacuum pump and a compressed air pump.

In systems operating using a single source pump, the first hose is the hose 124, represented in FIGS. 1A and 1B, connecting the tool directly to the source pump, where the term "connect" denotes the enabled flow of air, vacuum, or pressure.

In another embodiment, the pick and place robotic system further includes a valve and one or more second hoses, where the valve connects the proximal end of the first hose to one valve output selected from the group consisting of the atmosphere and the one or more second hoses.

In one embodiment, the pick and place robotic system further includes one or more source pumps, where at least one of the one or more second hoses connects a valve output to one of the one or more source pumps, at least one tool of the plurality of tools corresponds to one of the one or more source pumps, and a source pump of the one or more source pumps is selected from the group consisting of a vacuum pump and a compressed air pump.

In systems operating using more than one source pump (e.g., one vacuum pump and one compressed air pump), a valve is required to switch between pumps or to connect the tool to the atmosphere (i.e., disconnect from all pumps). In this case, the first hose is the distal segment of the hose 124 shown in FIGS. 1A and 1B. Furthermore, a second hose is required to connect the valve to each of the source pumps. The second hoses represent the proximal segments of the hose 124 shown in FIGS. 1A and 1B, connecting the valve to each of the source pumps.

In one embodiment, each source pump has a pump switch to activate it, and a pump selection switch is used by the control system to activate the required pump switch through data links or any other form of control signaling (e.g., an electrical ON/OFF signal).

In other embodiments, a fluid pump is used to control a tool. In this case, the through-hole, hoses, pressure sensors, and valve, are configured to operate with a fluid.

In one embodiment, the vision system includes a vision processor, a plurality of vision communication interfaces, and one or more vision components selected from the group consisting of a camera, a barcode reader, a depth sensor, an infrared sensor, a light curtain system, and a LIDAR; and where at least one component of the vision system is connected to the vision processor through a data link, and the vision processor is connected to the control system through a data link.

In one embodiment, the pick and place robotic system further includes a lighting source, where the lighting source is configured to emit multiple light intensities.

In one embodiment, the control system controls robotic arm movements through a motion controller. In one embodiment, the motion controller also controls the valve.

In one embodiment, data from the pressure sensor, the weight sensor, the tool wire, the vision system sensors, the tool sensors, or any other component with a communication interface, is transmitted at regular time intervals to the control system (i.e., a data push). In another embodiment, such data is transmitted only upon request from the control system (i.e., a data pull).

In one embodiment, the tool wire is configured to provide the control system with information on the presence of an attached tool at the end effector continuously and instantaneously, through an electrical signal.

Construction and Components of the Structural Load Cell Case

Figure 2A:
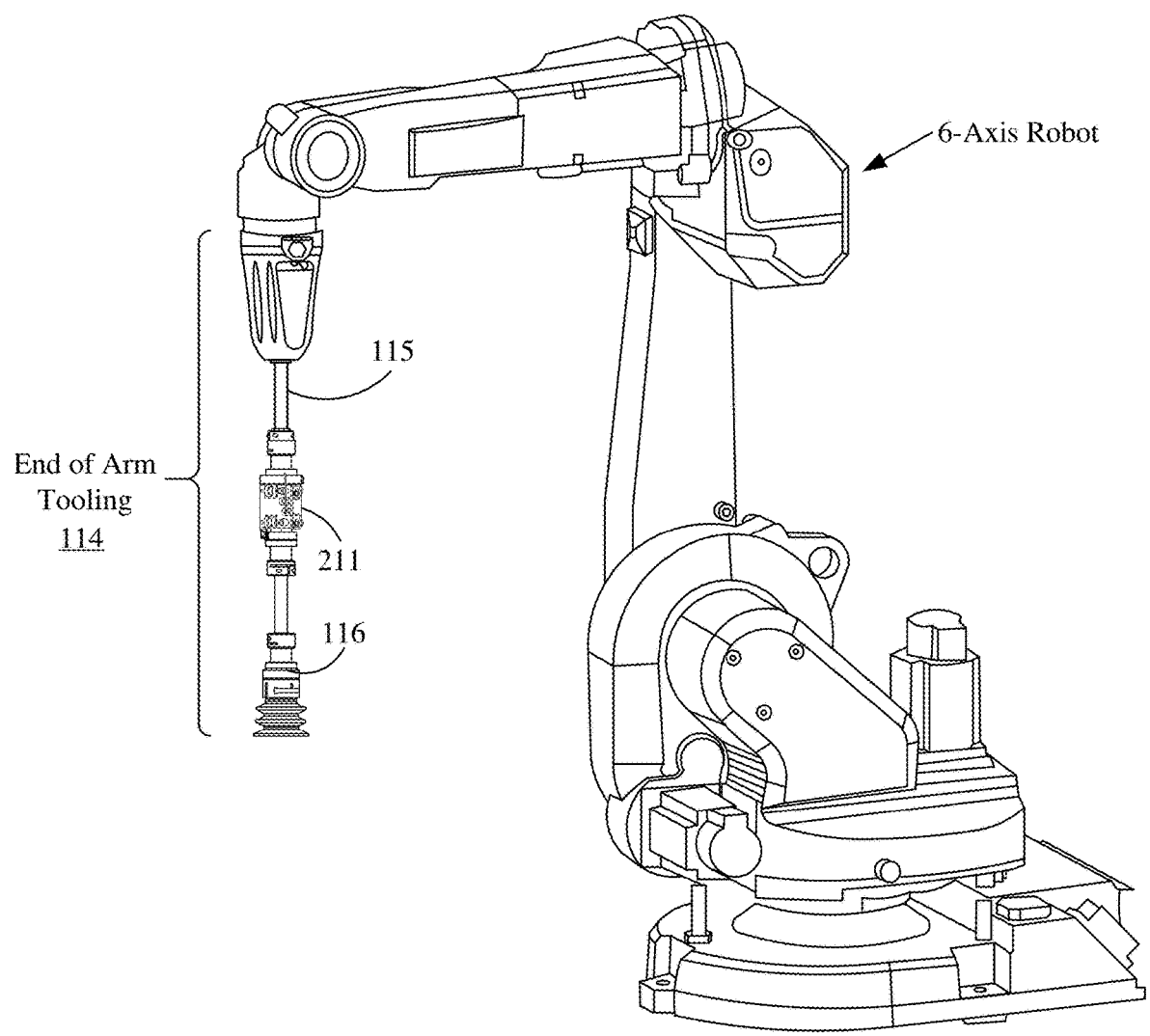
FIG. 2A shows an exemplary structural load cell case in the context of a robotic system, in accordance with one embodiment of the invention.

FIG. 2A shows an exemplary structural load cell case 211 in the context of a robotic system 210, in accordance with one embodiment of the invention. In some embodiments, the structural load cell case 211 is a component of weight sensor 131 and may be embedded within the end of a robotic arm 102 of the robotic system 210, which may be an embodiment of robotic system 100 as shown in FIGS. 1A, 1B, and 1C. The structural load cell case 211 may be designed to be modularly compatible with any type of end effector 114 so that it may be easily or quickly installed or replaced. In some embodiments, the structural load cell case 211 is installed in-line with a shaft tube 115 (e.g., 16 mm diameter). In some embodiments, the device passes vacuum from an end effector 114 to a downstream end effector tool 116 using external air hoses or fittings. In some embodiments, using internal air channels, the device passes vacuum from an end effector to a downstream end effector tool without the need for external air hoses or fittings.

Figure 2B:
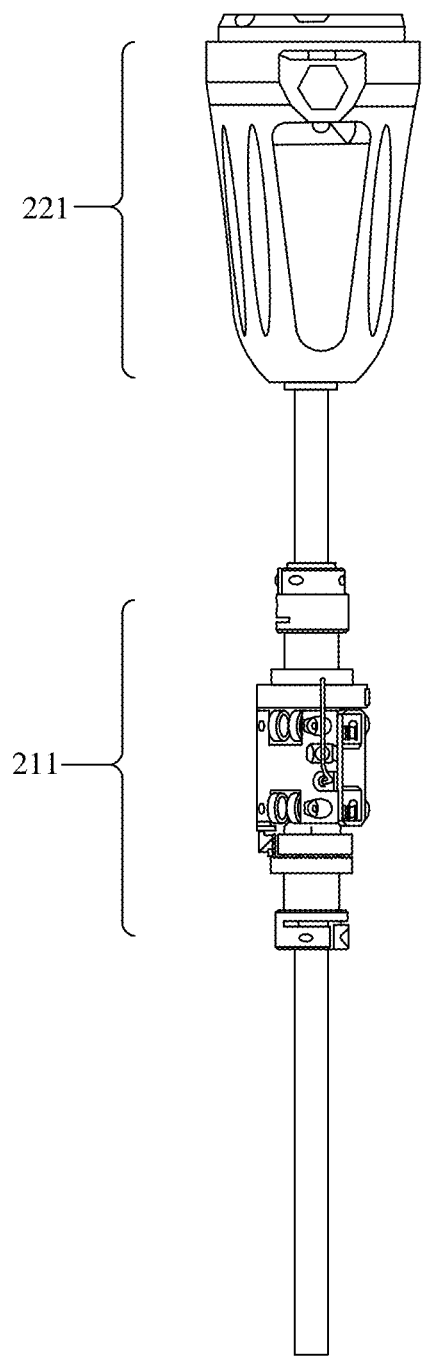
FIG. 2B shows an exemplary structural load cell case in the context of a robotic arm, including a vertical compliance mechanism, of a robotic system, in accordance with one embodiment of the invention.

FIG. 2B shows an exemplary structural load cell case 211 in the context of a robotic arm 220, including a vertical compliance mechanism 221, of a robotic system 210, in accordance with one embodiment of the invention. In some embodiments, the structural load cell case 211 is installed between a vertical compliance mechanism 221 and a pick-and-place tool 116 (not shown).

Figure 2C:
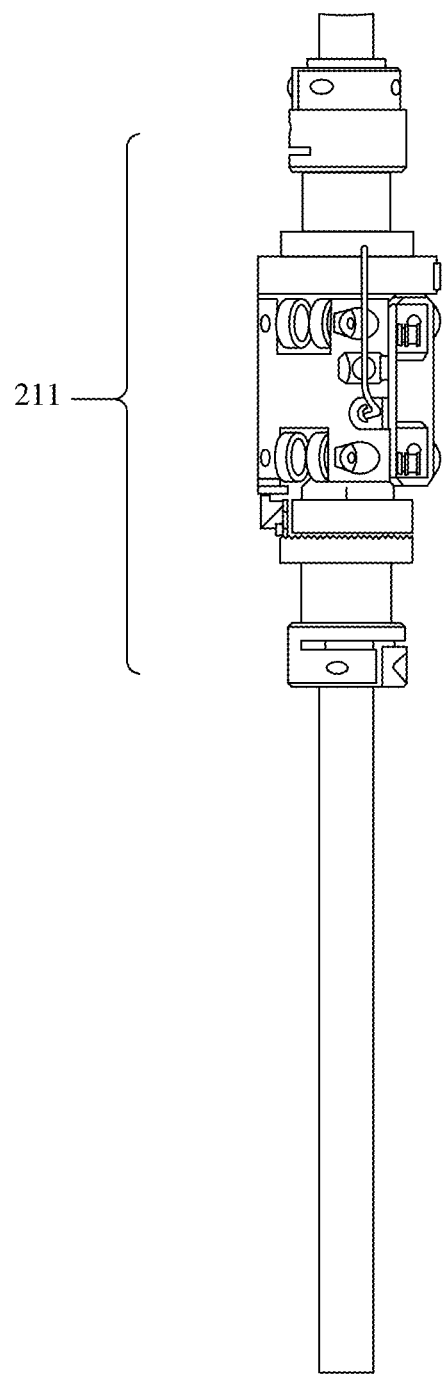
FIG. 2C shows an exemplary structural load cell case in the context of a robotic arm, excluding a vertical compliance mechanism, of a robotic system, in accordance with one embodiment of the invention.

FIG. 2C shows an exemplary structural load cell case 211 in the context of a robotic arm 230, excluding a vertical compliance mechanism 221, of a robotic system 210, in accordance with one embodiment of the invention.

Figure 2D:
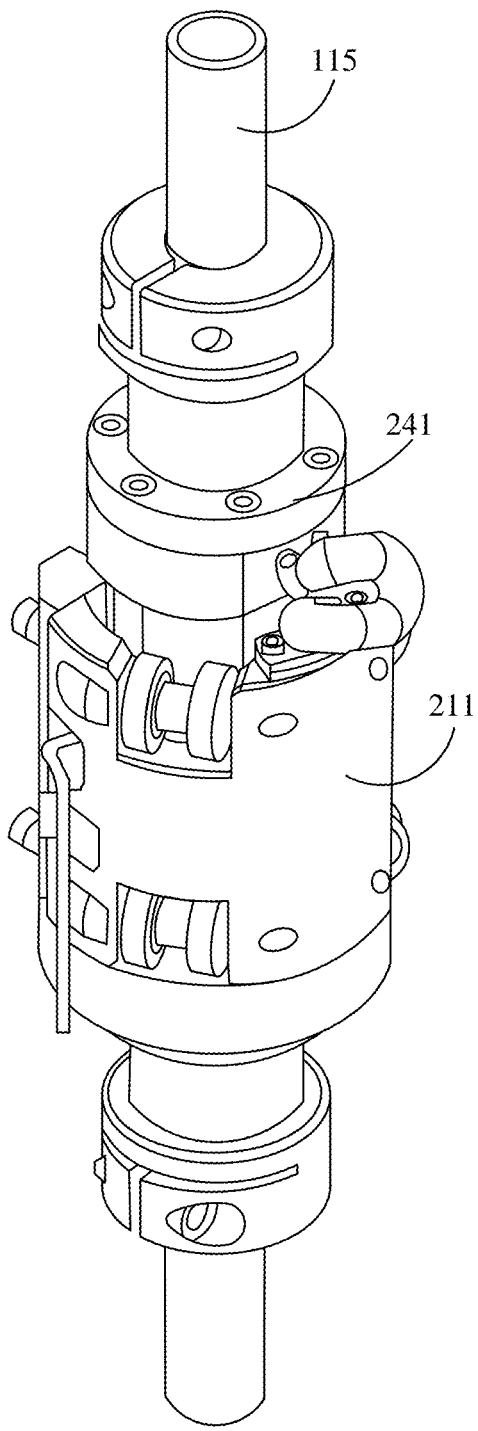
FIG. 2D shows an exemplary structural load cell case connected to a tube of a robotic arm of a robotic system via a flange clamp, in accordance with one embodiment of the invention.

FIG. 2D shows an exemplary structural load cell case 211 connected to a shaft 115 of a robotic arm 240 of a robotic system 210 via a flange clamp 241, in accordance with one embodiment of the invention. In such embodiments, the flange clamp 241 is used to mount the structural load cell case 211 to the vertical compliance mechanism 221. This tube clamp installation provides superior bending resistance.

Figure 2E:
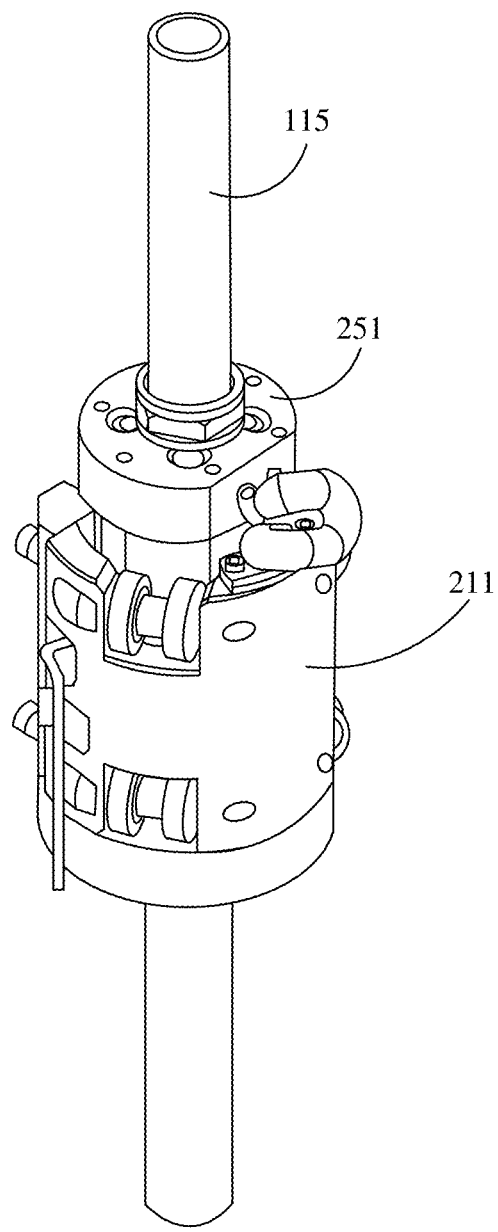
FIG. 2E shows an exemplary structural load cell case connected to a tube of a robotic arm of a robotic system via a pneumatic fitting, in accordance with one embodiment of the invention.

FIG. 2E shows an exemplary structural load cell case 211 connected to a shaft 115 of a robotic arm 250 of a robotic system 210 via a pneumatic fitting 251, in accordance with one embodiment of the invention. In such embodiments, the structural load cell case 211 is attached to the vertical compliance mechanism 221 via a pneumatic fitting 251.

FIG. 2F shows a see-through view 260 of an exemplary structural load cell case 261 in the context of a robotic arm 102 of a robotic system 210, in accordance with one embodiment of the invention. The dotted boundary of the casing 481 is for the reader's convenience. The casing serves to protect the inner components from bumps, and to prevent dust and debris from accumulating on the inner components.

FIG. 2G shows a see-through view 270 of an exemplary structural load cell case 261 connected to a shaft 115 of a robotic arm 102 of a robotic system 210, in accordance with one embodiment of the invention. This view shows the structural load cell case 261 from FIG. 2F in greater detail. The purpose of the soft washers 271 is to cushion the impact of the shaft clamp 273 against the tube body 115, or the impact of the structural load cell case 261 against the tube body 115. Those components impact when the robotic arm 102 pushes down on an object, the tube 115 slides, and the robotic arm 102 moves back up.

Figure 3A:
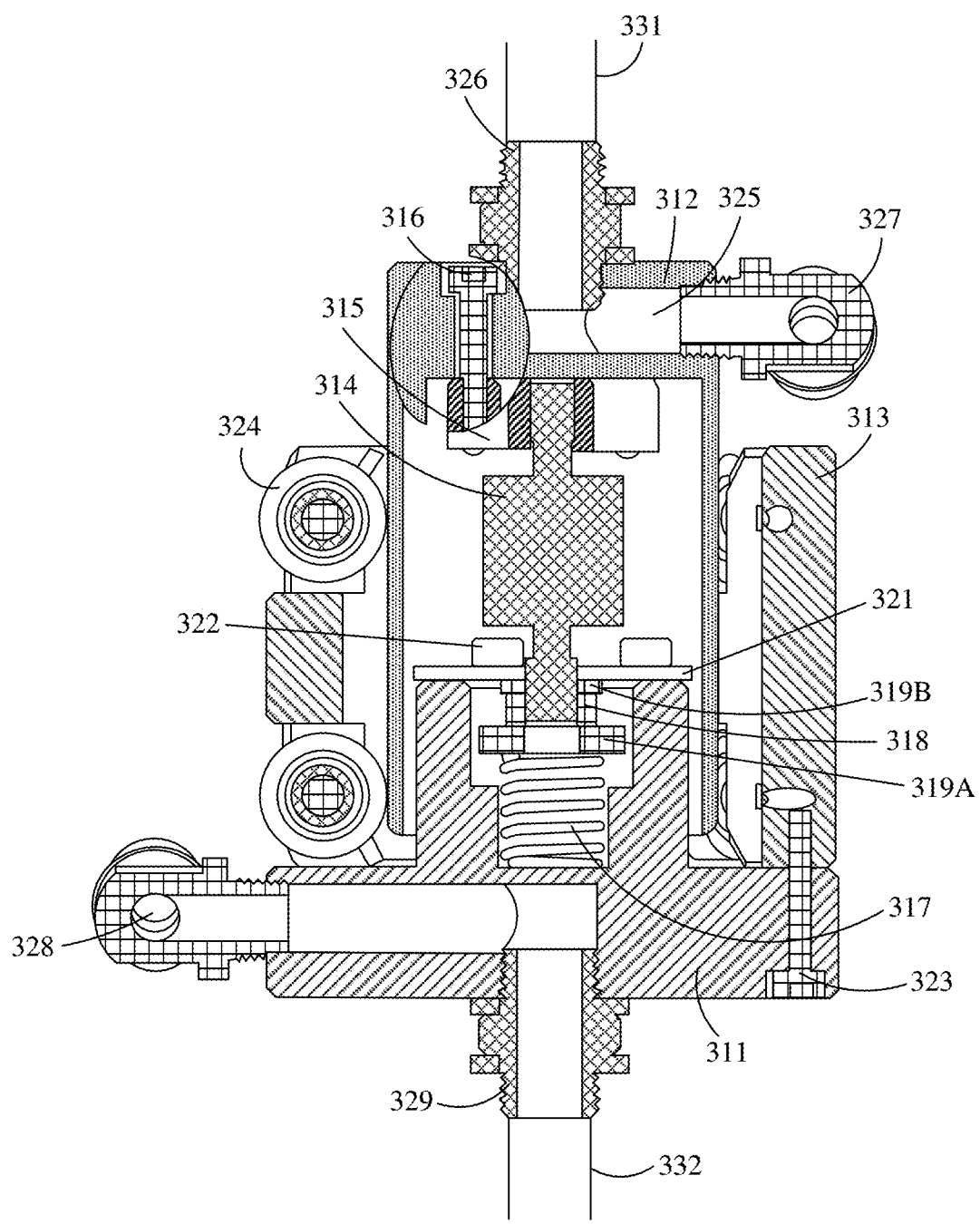
FIG. 3A shows a cross-sectional side view of an example structural load cell case, where a conduit system uses an external flexible tube, for a robotic system, in accordance with one embodiment of the invention.

FIG. 3A shows a cross-sectional side view of an example structural load cell case 310, where a conduit system uses an external flexible tube (not shown in FIG. 3A), for a robotic system 210, in accordance with one embodiment of the invention. The structural load cell case 310 employs a roller bearing system to isolate and measure vertical loads, while rejecting side loads, bending moments, and torsion moments. The inner portion moves freely relative to the fixed roller assembly, and the two halves are connected by a load cell (e.g., a force sensor) housed in the structural load cell case 310. In some embodiments, a conduit system (e.g., air channels) transmits a fluid (e.g., air) from the top to the bottom of the device. In some embodiments, the fixed and active halves of the assembly are connected by a flexible air tube (not shown in FIG. 3A), which allows the transmission of vacuum pressure without restricting the motion of the shaft (e.g., hex tube).

The structural load cell case 310 includes a base 311, an inner tube 312, and a roller sleeve 313. The structural load cell case 310 and related systems are described herein with the vertical direction being the dimension along which force is to be measured by a load cell 314, namely a load cell that is housed by the structural load cell case 310.

The inner tube 312 is the principal component that houses and protects the load cell 314 by transferring bending and shear forces away from the load cell 314. This feature is helpful when the robotic arm 102 undergoes high acceleration or deceleration in various directions, which is typical in many efficient pick-and-place scenarios. Without the bending and shear forces being eliminated, this acceleration or deceleration results in high forces being transferred to the load cell 314, which may affect the accuracy of the measurement and/or damage the load cell 314. In some embodiments, the top part of the load cell 314 is secured to an adapter plate 315, which is in turn secured to the inner tube 312 via a plurality of screws 316. In other embodiments, the load cell 314 is directly attached to the inner tube 312.

A flexible joint 317 sits in the base 311 and interfaces with the load cell 314, which allows the load cell 314 to tilt or compress. In some embodiments, the flexible joint 317 is a ball joint. In some embodiments, the flexible joint 317 is a compression spring 317 (as shown in FIG. 3A). In some embodiments, the compression spring 317 is configured to allow the load cell 314 to move laterally (e.g., it is able to slide side-to-side before assembly), which ensures that the load cell 314 is not placed under any side loading.

In some embodiments, the interfacing includes a retaining nut 318 that threads onto the bottom part of the load cell 314, and the compression spring 317 pushes on the load cell 314. In some embodiments, the interfacing includes the bottom part of the load cell 314 being directly connected to the compression spring 317, which may be a single-piece threaded machined component. In some embodiments, one part of the retaining nut 318 is enclosed by a plurality of low-friction washers 319A, which allows the load cell 314 to slide horizontally against the compression spring 317. In some embodiments, the bottom part of the load cell 314 runs through a retaining washer 321, whose oversized center hole allows the load cell 314 to slide horizontally and tilt. The retaining washer 321 is secured to the base 311 via screws 322 or other fastening mechanisms. The retaining washer 321 is in contact with a plurality of low-friction washers 319B, which allows the load cell 314 to slide against the retaining washer 321.

As the top part of the load cell 314 is secured to the inner tube 312 and the bottom part of the load cell 314 is secured to the base 311, the relative motion between the top part of the load cell 314 and the bottom part of the load cell 314 is constrained by the roller sleeve 313, which prevents the inner tube 312 from bending or twisting relative to the base 311. The roller sleeve 313 is secured to the base 311 via screws 323 or other fastening mechanisms. In some embodiments, the roller sleeve 313 includes a plurality of roller bearings 324, which contacts the inner tube 312 and transfers bending and shear forces. The inner tube 312 is free to slide vertically along the roller sleeve 313 guided by the plurality of roller bearings 324, but other motion, such as rotation and horizontal translation, are not permitted by the geometries of the inner tube 312 and that of the roller sleeve 313. In other embodiments, the roller sleeve 313 includes a plurality of linear bearings or a plurality of air bearings, which guide the inner tube 312 as the inner tube 312 slides vertically along the roller sleeve 313.

In some embodiments, the structural load cell case 310 is configured to limit the maximum positive force (e.g., a pull) or maximum negative force (e.g., a push) measured by the load cell 314. This is achieved by constraining the range of vertical sliding of the inner tube 312 along the roller sleeve 313. When the vertical sliding reaches a limit on either side, the structural load cell case 310 stops the inner tube 312 from sliding any further, which limits the range of forces transferred to the load cell 314. By designing the range of vertical sliding appropriately for a particular load cell 314, the load cell 314 is thus protected from force exertion beyond its acceptable limits, which prevents damaging the load cell 314.

Finally, in some embodiments, the structural load cell case 310 includes a conduit system that transfers a fluid, e.g., air, between the top and bottom parts of the structural load cell case 310. In some embodiments, the conduit system includes a plurality of pneumatic fittings. In such embodiments, the inner tube 312 includes a built-in air channel 325, machined into the component. A first pneumatic fitting 326 connects the inner tube 312 to a top tube 331. In some embodiments, the top tube 331 is rigid. In other embodiments, the bottom tube 332 is non-rigid, i.e., flexible. The first pneumatic fitting 326 channels to a second pneumatic fitting 327 on the inner tube 312 via the built-in air channel 325, which connects to a first end of an external flexible tube (tube not shown in FIG. 3A). A second end of the external flexible tube connects to a third pneumatic fitting 328 on the base 311, which channels to a fourth pneumatic fitting 329, which connects the base 311 to a bottom tube 332. In some embodiments, the bottom tube 332 is rigid. In other embodiments, the bottom tube 332 is non-rigid, i.e., flexible. Through the series of sealed channels, a fluid, such as pressurized air, is able to travel undisturbed from the top tube 331 and through the channels in the inner tube 312 and the based into the bottom tube 332. Another embodiment of the conduit system is shown in FIG. 3D. In some embodiments, the first pneumatic fitting 326 and the fourth pneumatic fitting 329 are clamp designs, customized to fit the top tube 331 and the bottom tube 332.

In some embodiments, the conduit system that transfers a fluid is configured so that when the conduit system is transferring a positive pressure (e.g., compressed air) or a negative pressure (e.g., a vacuum), this pressure does not affect the forces measured by the load cell 314. Therefore, any effects of fluid pressure applied to a pick-and-place tool on measurements from the load cell 314 are eliminated. This feature is an advancement over traditional load cell systems installed on pick-and-place robotic end effectors, where positive pressures or negative pressures affect the forces measured by the load cell 314, which causes inaccuracies in the intended measurements, e.g., the weight of a picked load. For example, when a vacuum-operated suction picks up a load 103, the vacuum pressure pulls in the walls of the tube, shaft 115, or other conduit channels for the vacuum, which increases the force measured by the load cell 314.

Figure 3B:
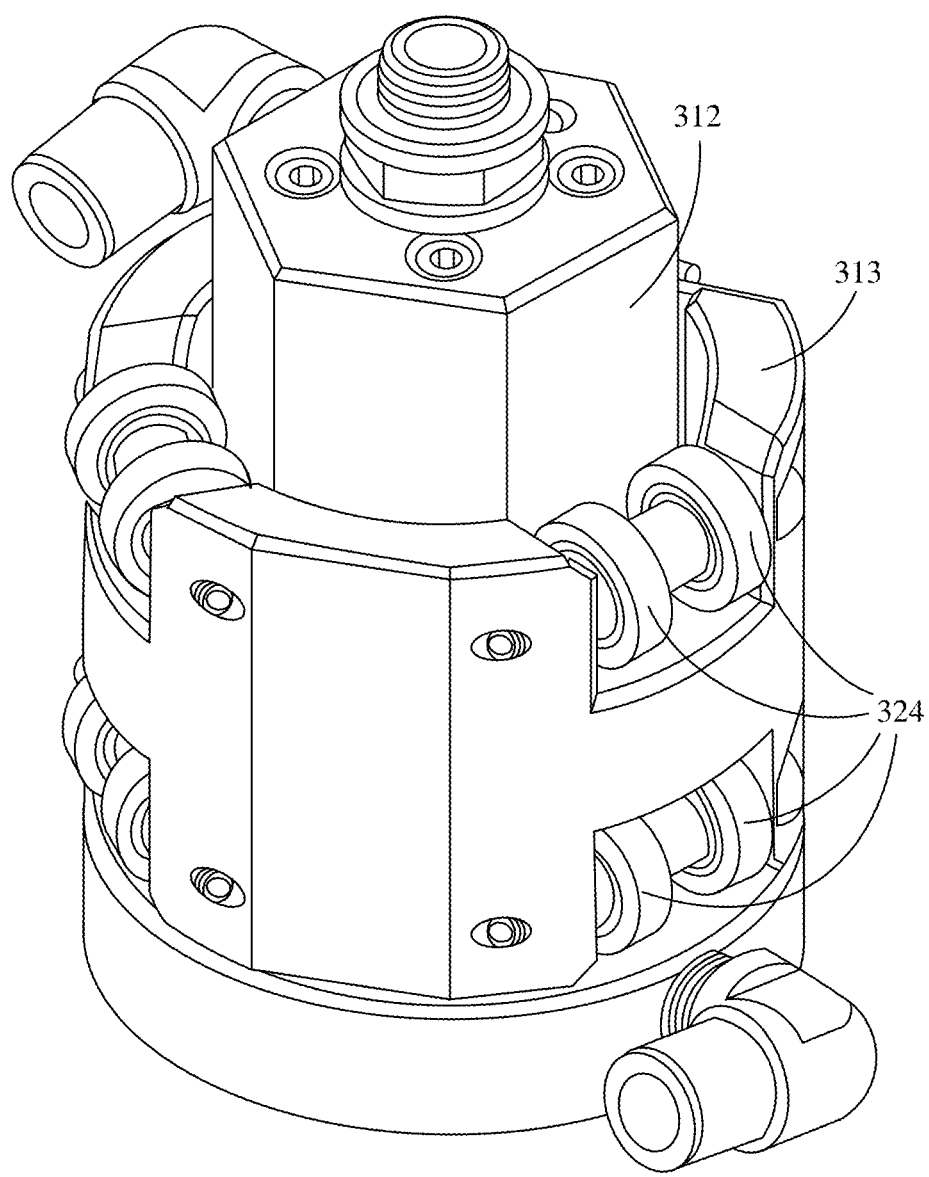
FIG. 3B shows an isometric view of an example structural load cell case, where a conduit system uses an external flexible tube, for a robotic system, in accordance with one embodiment of the invention.

FIG. 3B shows an isometric view 320 of an example structural load cell case 310, where a conduit system uses an external flexible tube, for a robotic system, in accordance with one embodiment of the invention. In some embodiments, the inner tube 312 has a non-circular (e.g., polygonal) cross-sectional shape, which prevents rotation within the roller sleeve 313. In some embodiments, the roller sleeve 313 includes three sets of roller bearings 324, where each set of roller bearings 324 slides along one wall of the polygonal cross-section, and the three sets are space equidistantly along the roughly circular roller sleeve 313. In some embodiments, the polygonal cross-sectional shape is a hexagon.

Figure 3C:
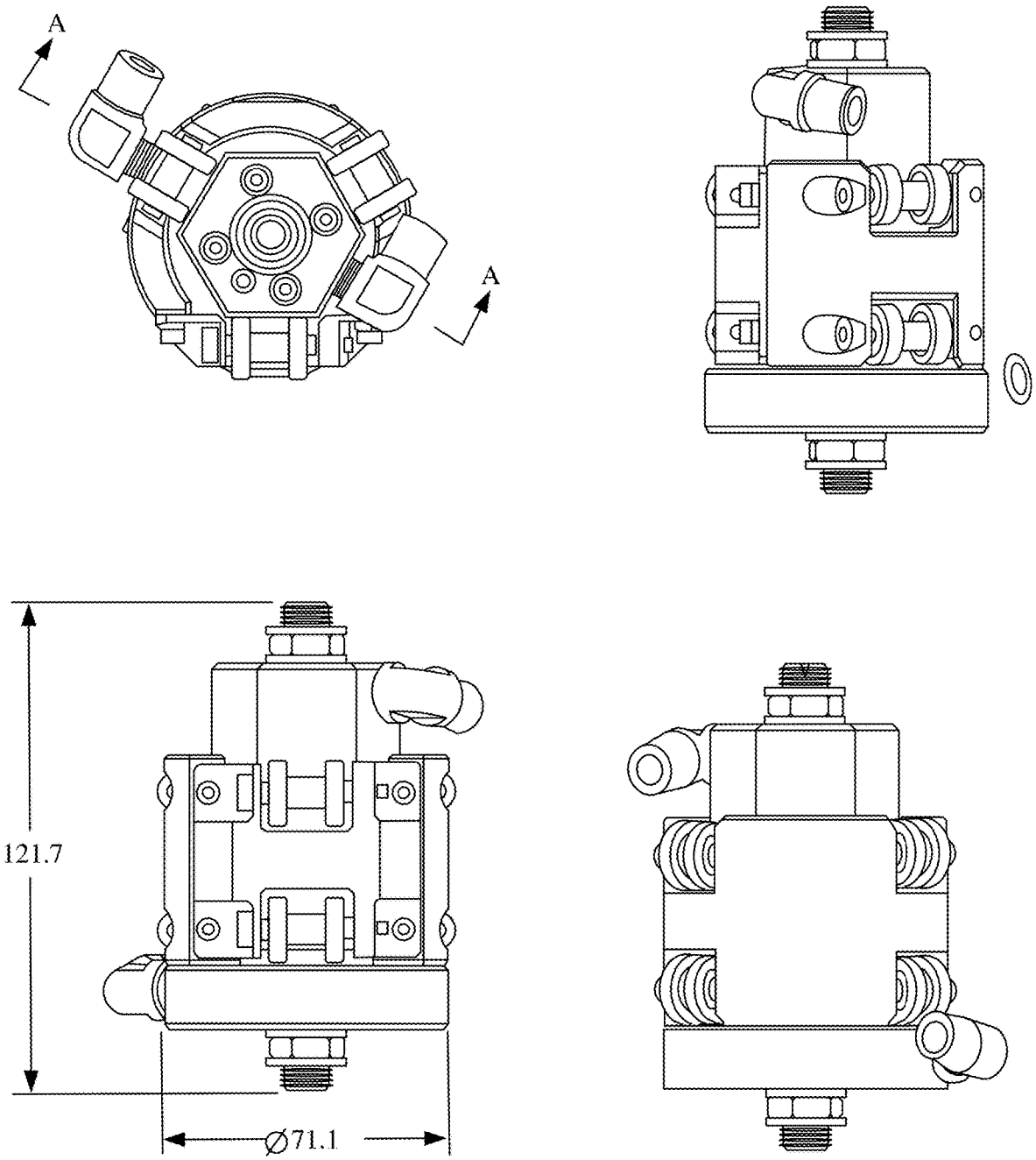
FIG. 3C shows various top and side views of an example structural load cell case, where a conduit system uses an external flexible tube, for a robotic system, in accordance with one embodiment of the invention.
Figure 3D:
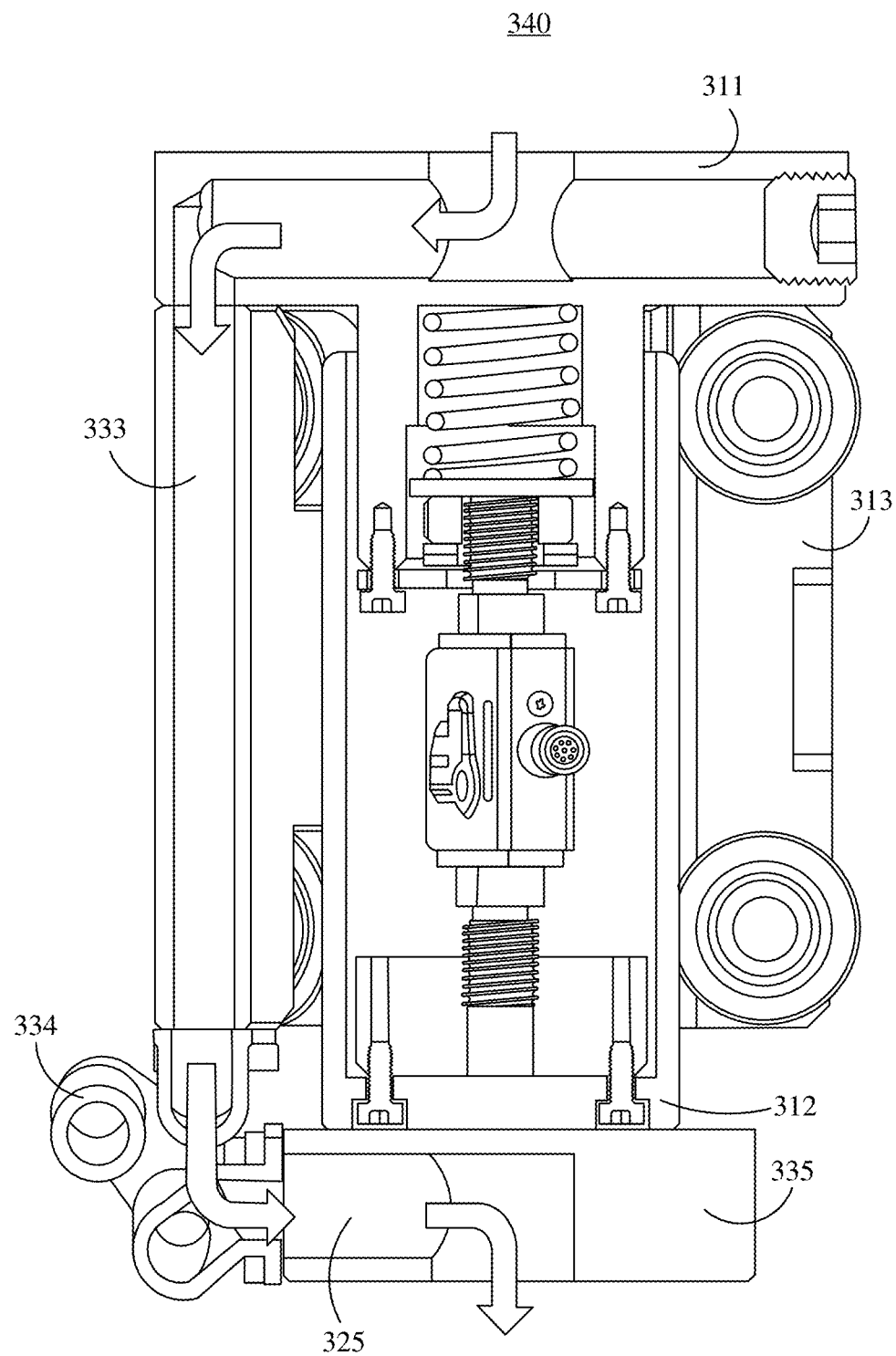
FIG. 3D shows a cross-sectional side view of an example structural load cell case, with an internal air channel, for a robotic system, in accordance with one embodiment of the invention.

FIG. 3C shows various top and side views 330 of an example structural load cell case 310, where a conduit system uses an external flexible tube, for a robotic system, in accordance with one embodiment of the invention.

FIG. 3D shows a cross-sectional side view of an example structural load cell case 340, with an internal air channel 333, for a robotic system, in accordance with another embodiment of the invention. (The orientation of the structural load cell case in FIG. 3D is 180 degrees rotated compared to FIG. 3A.) Unlike the load cell 310, where the conduit system uses an external flexible tube to connect the top and bottom of the device, the conduit system of structural load cell case 340 includes an internal air channel 333 and a flexible air fitting 334. In some embodiments, the internal air channel is part of the roller sleeve 313. In some embodiments, the flexible air fitting 334 is a piece that bridges the gap between the two halves of the device without affecting weight measurements or compressing significantly under pressure.

Like the structural load cell case 310, the internal air channel and the flexible air fitting 334 are configured so that when the internal air channel is transferring a positive pressure (e.g., compressed air) or negative pressure (e.g., a vacuum), this pressure does not affect the forces measured by the load cell 314.

In some embodiments, structural load cell case 340 further includes a manifold plate 335, which houses a built-in air channel 325, similar to the one of structural load cell case 310. Note that various permutations of these features are possible: A structural load cell case 340 may be constructed with either the built-in air channel 325 machined into the inner tube 312 component as in structural load cell case 310 or with the manifold plate 335 of structural load cell case 340 independently of the choice of conduit systems described above. The manifold plate 335 bolts to the rest of the inner tube 312. In some embodiments, the flexible air fitting 334 described above connects the manifold plate 335 to the internal air channels, which creates a sealed path to the bottom of the base 311.

Figure 3E:
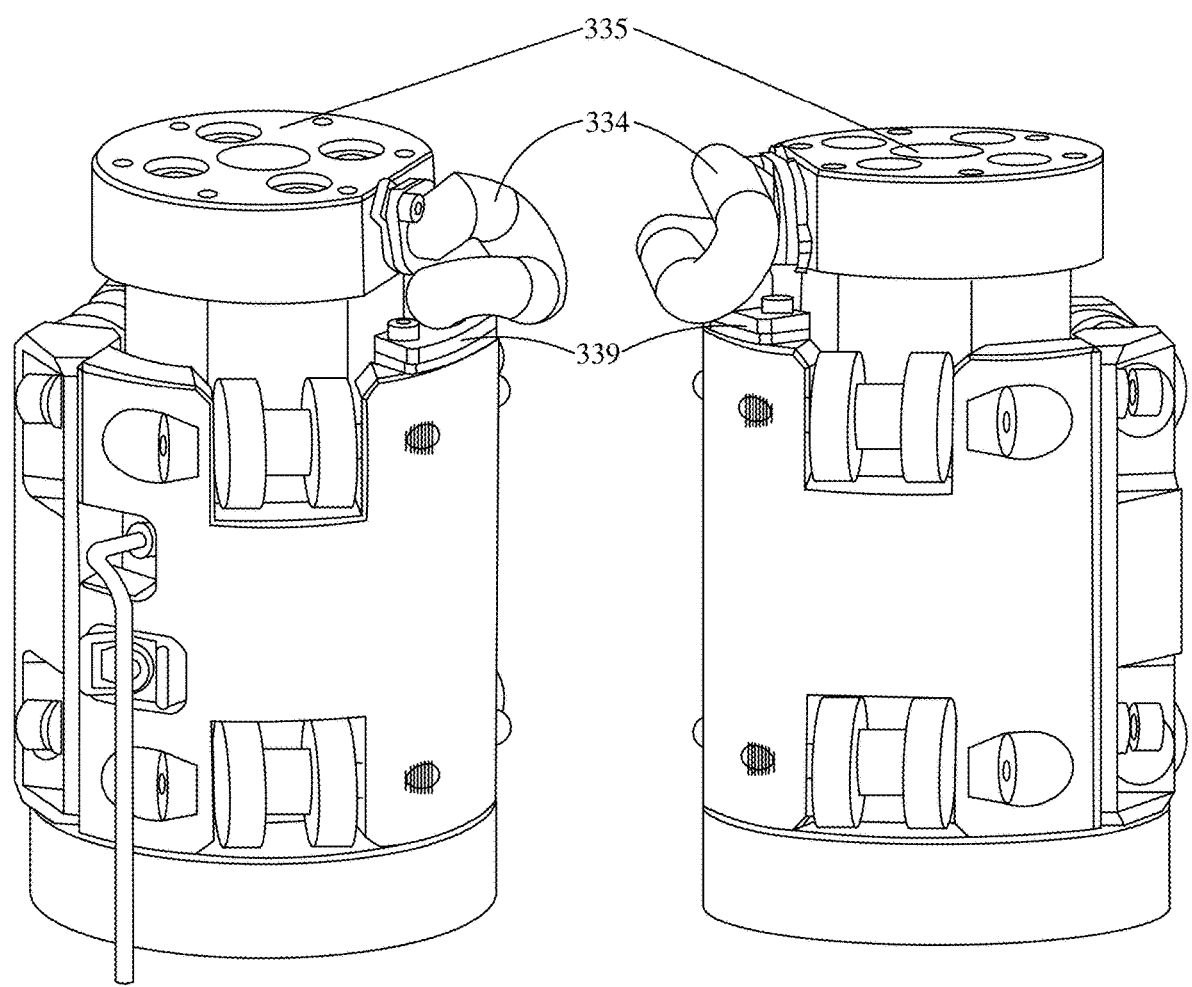
FIG. 3E shows various semi-side views of an example structural load cell case, with an internal air channel, for a robotic system, in accordance with one embodiment of the invention.

FIG. 3E shows various semi-side views 350 of an example structural load cell case 340, with an internal air channel 333, for a robotic system, in accordance with one embodiment of the invention. Clamps 339 attach the flexible air fitting 334 snugly to the manifold plate 335 and the rest of the structural load cell case 340.

Figure 3F:
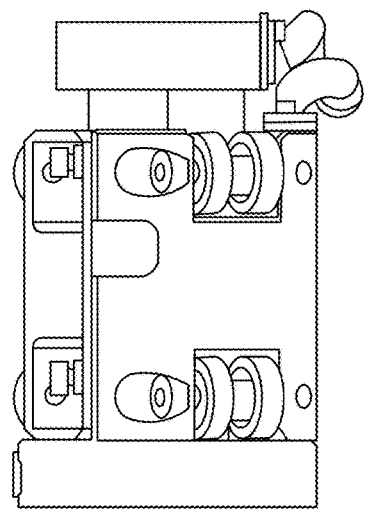
FIG. 3F shows various side, top, and bottom views of an example structural load cell case, with an internal air channel, for a robotic system, in accordance with one embodiment of the invention.
Figure 3F:
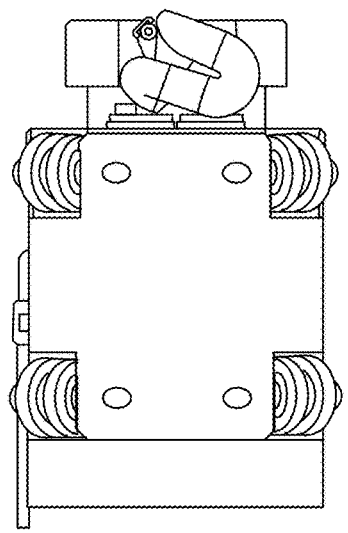
Figure 3F:
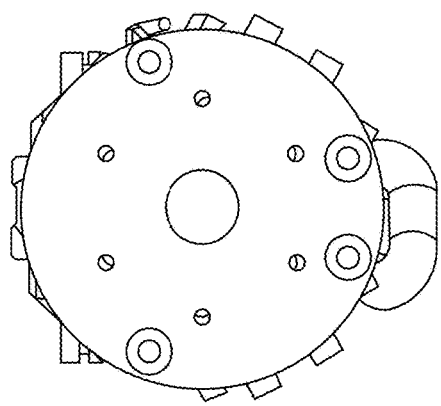
Figure 3F:
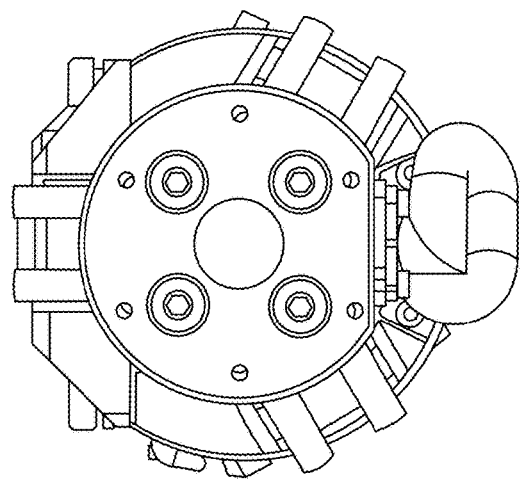

FIG. 3F shows various side, top, and bottom views 360 of an example structural load cell case 340, with an internal air channel 333, for a robotic system, in accordance with one embodiment of the invention.

Figure 4A:
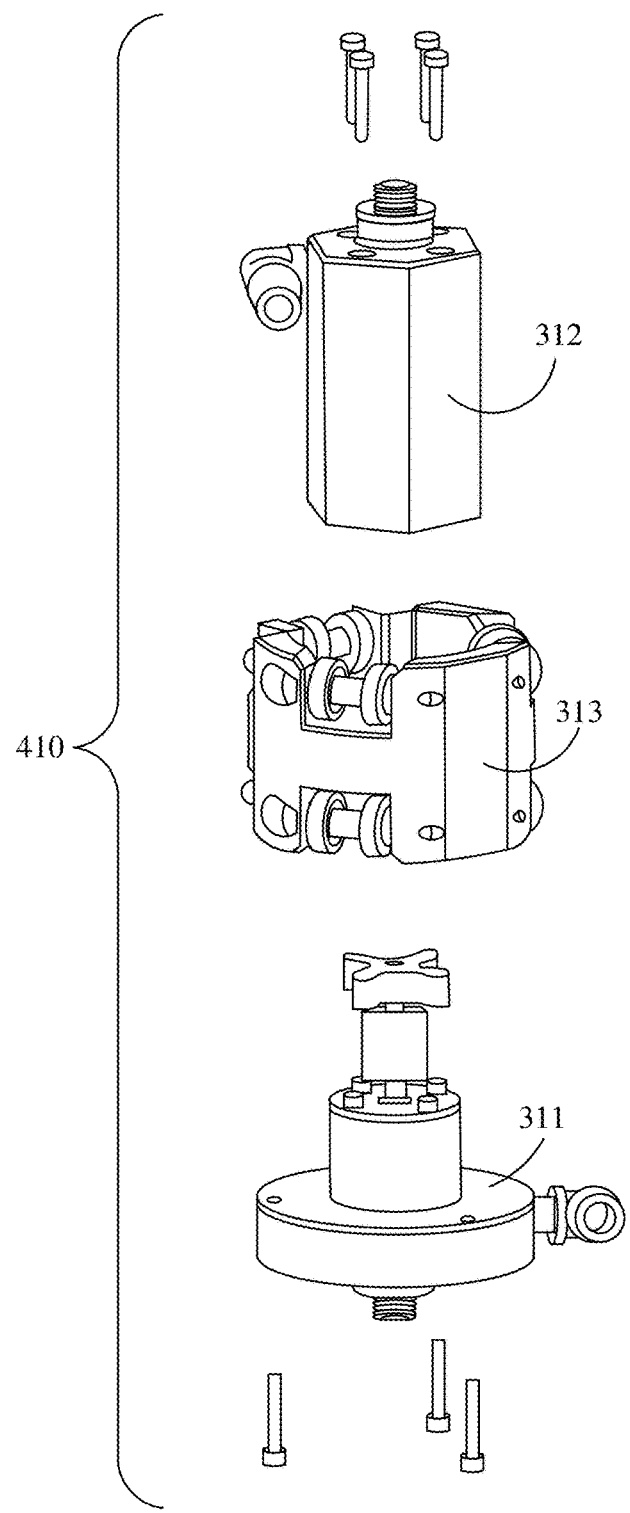
FIG. 4A shows an exploded view of an example structural load cell case for a robotic system, in accordance with one embodiment of the invention.

FIG. 4A shows an exploded view 410 of an example structural load cell case 340 for a robotic system, in accordance with one embodiment of the invention. This figure shows the base 311, the inner tube 312, and the roller sleeve 313.

Figure 4B:
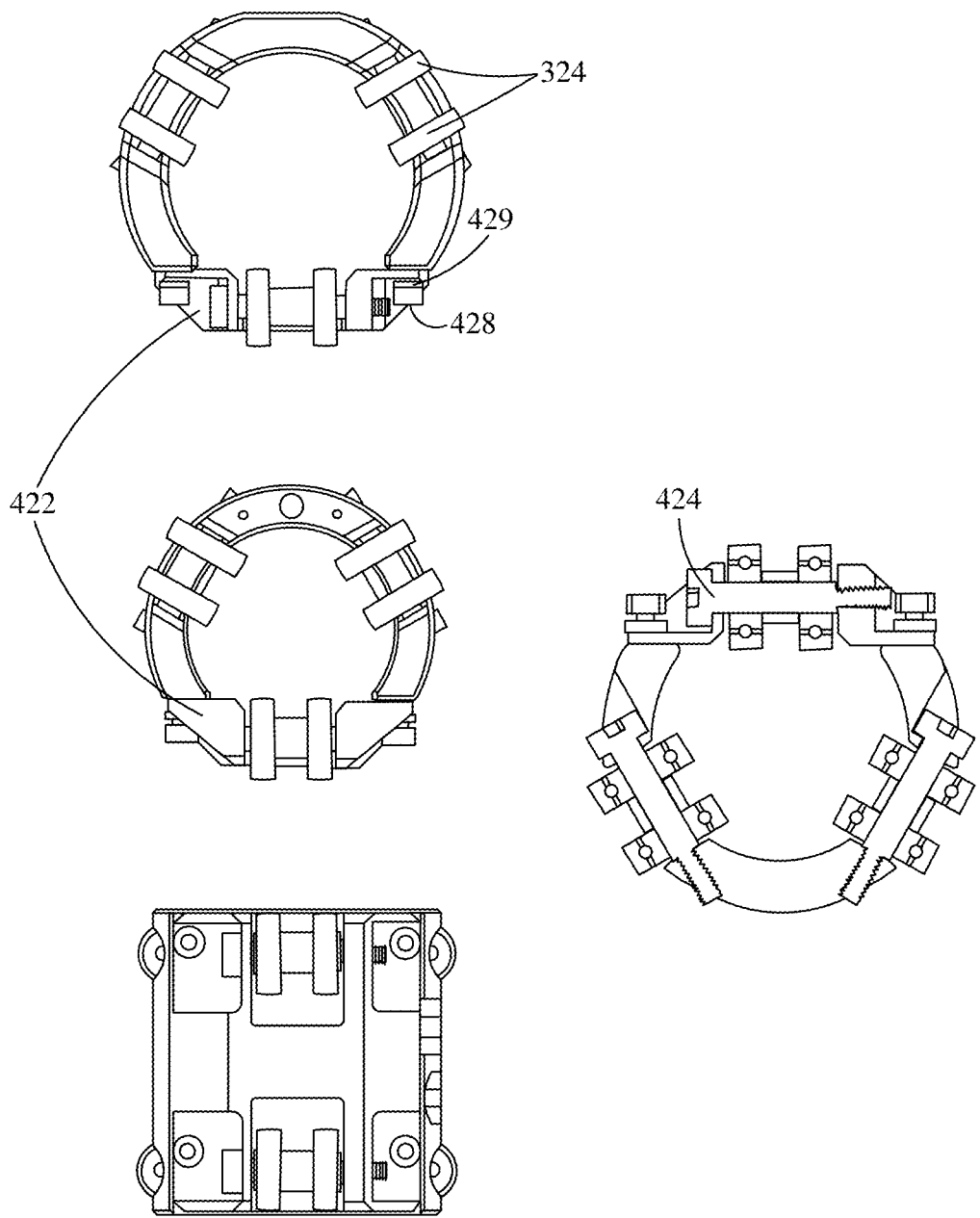
FIG. 4B shows a top view of a roller sleeve of an example structural load cell case for a robotic system, in accordance with one embodiment of the invention.

FIG. 4B shows a top view 420 of a roller sleeve 313 of an example structural load cell case 340 for a robotic system, in accordance with one embodiment of the invention. In some embodiments, the roller sleeve 313 further includes a wheel bracket 422, which allows for the snug adjustment of wheels against the inner tube 312. A plurality of screws 428 and rubber washers 429 secures the wheel bracket 422 to the roller sleeve 313 and provides the roller bearings 324 a light preload force. The roller bearings rotate around shoulder screws 424.

Figure 4C:
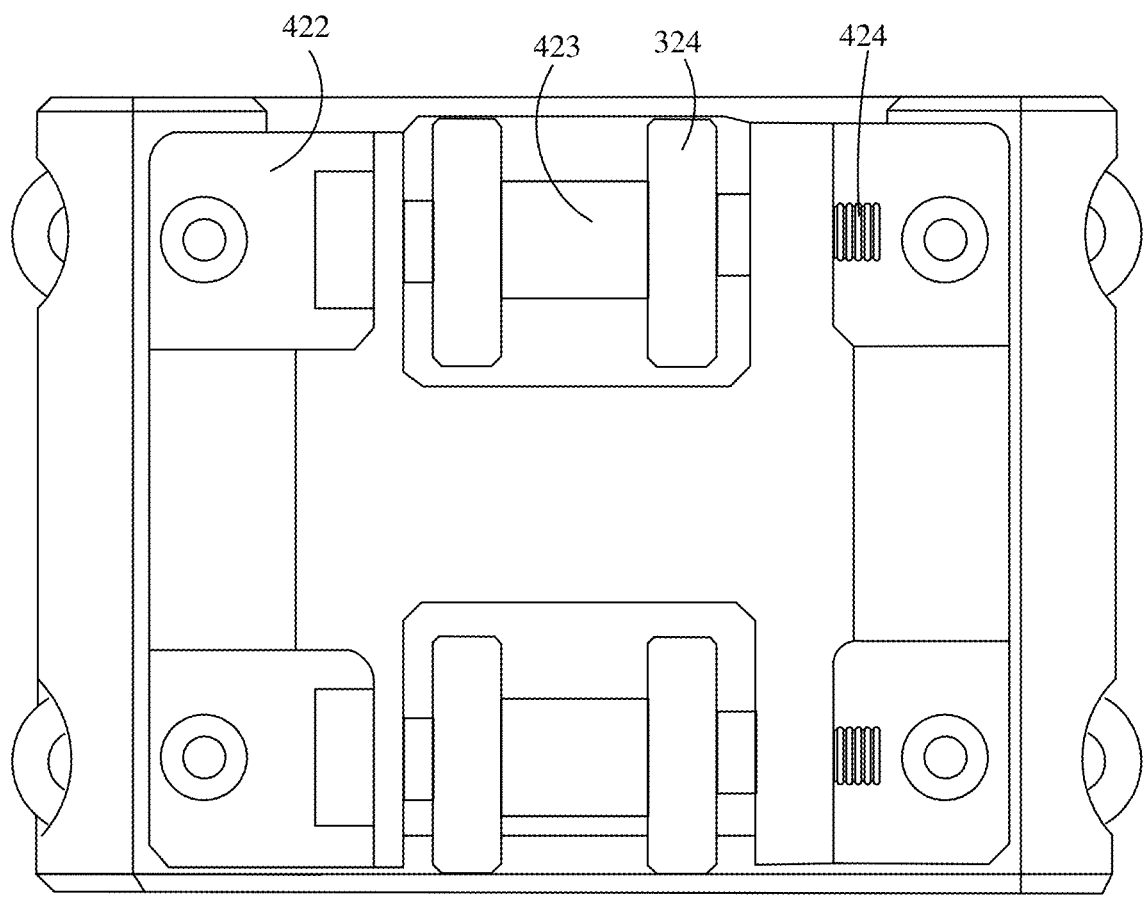
FIG. 4C shows a side view of a roller sleeve of an example structural load cell case for a robotic system, in accordance with one embodiment of the invention.

FIG. 4C shows a side view 430 of a roller sleeve 313 of an example structural load cell case 340 for a robotic system, in accordance with one embodiment of the invention. This figure shows a wheel bracket 422, a roller bearing 324, a spacer 423, and a shoulder screw 424.

Figure 4D:
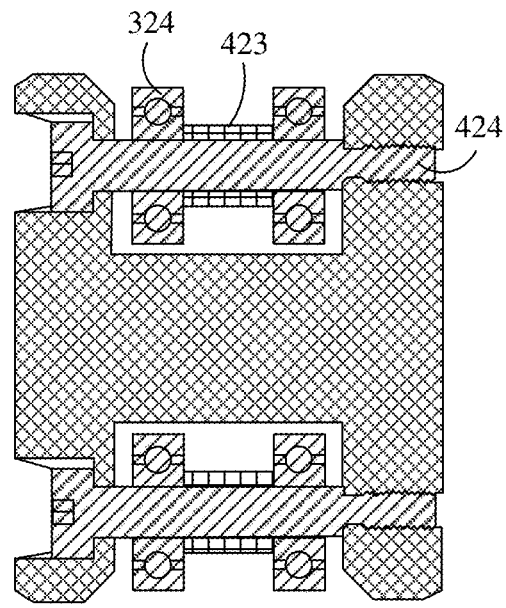
FIG. 4D shows a cutaway view of a roller sleeve of an example structural load cell case for a robotic system, in accordance with one embodiment of the invention.

FIG. 4D shows a cutaway view 440 of a roller sleeve 313 of an example structural load cell case 340 for a robotic system, in accordance with one embodiment of the invention. In some embodiments, a plurality of roller bearings 324, e.g., a pair, roll together by being on the same shoulder screw 424, which is affixed to the roller sleeve 313. In some embodiments, a spacer 423 between roller bearings 324 on the same shoulder screw 424 keeps the roller bearings 324 separated, which provides additional mechanical support for the inner tube 312 against which the roller bearing is rolling. In some embodiments, a plurality of shoulder screws 424, each holding a plurality of roller bearings 324, are aligned vertically along a side of the roller sleeve 313, e.g., one at the top and one at the bottom, as shown in FIG. 4D, so that various vertical points of the wall of the inner tube 312 are supported.

Figure 4E:
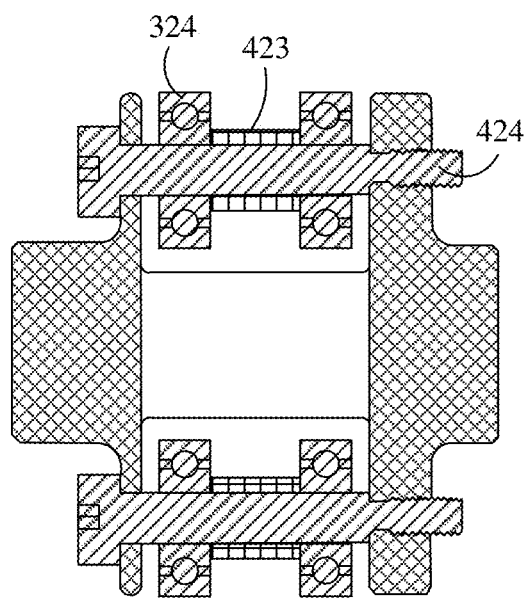
FIG. 4E shows a cutaway view of a wheel bracket of an example structural load cell case for a robotic system, in accordance with one embodiment of the invention.

FIG. 4E shows a cutaway view 450 of a wheel bracket 422 of an example structural load cell case 340 for a robotic system, in accordance with one embodiment of the invention.

Figure 4F:
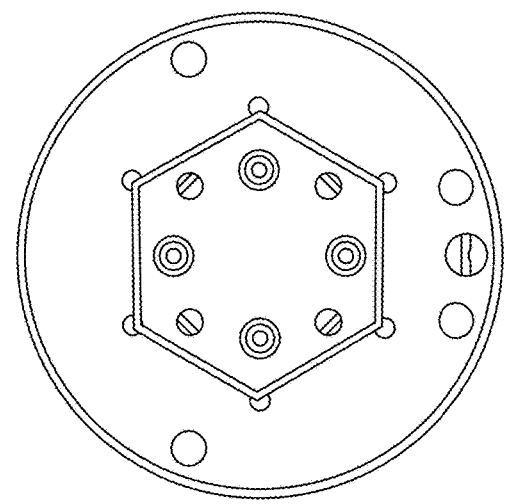
FIG. 4F shows various views of an inner sub-assembly of an example structural load cell case for a robotic system, in accordance with one embodiment of the invention.
Figure 4F:
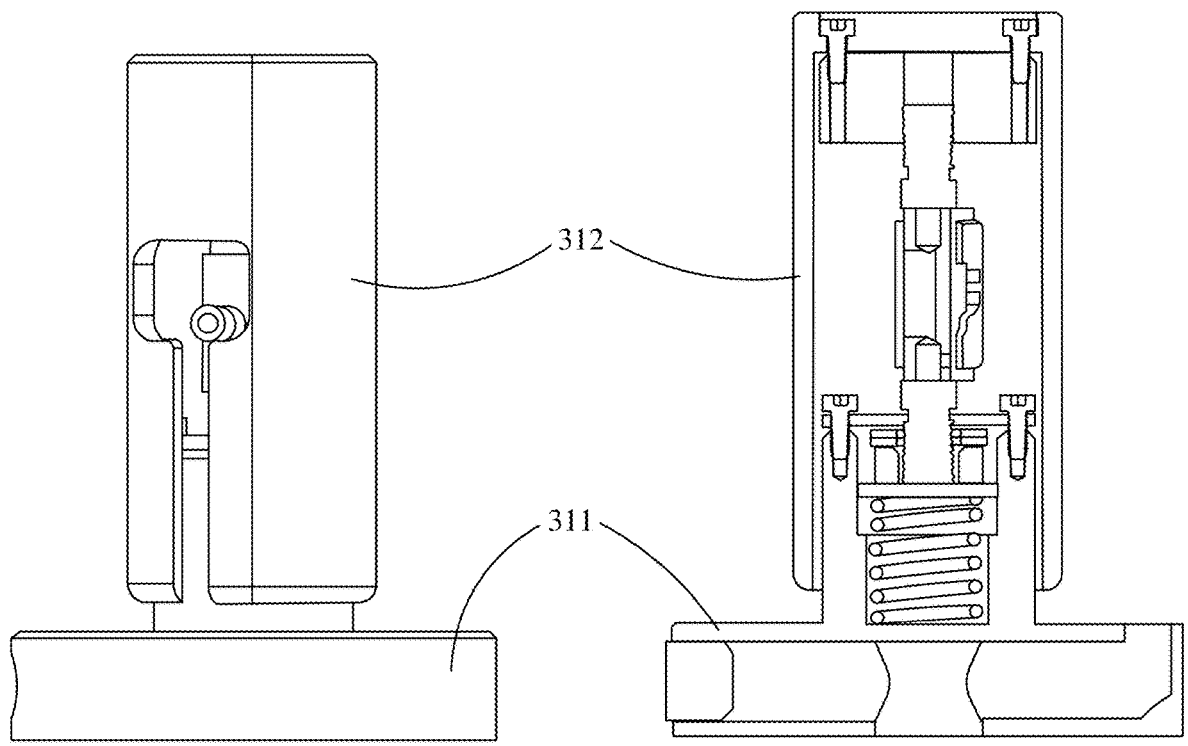

FIG. 4F shows various views of an inner sub-assembly 460 of an example structural load cell case 340 for a robotic system, in accordance with one embodiment of the invention. The inner sub-assembly 460 includes a base 311 connected to an inner tube 312.

Figure 4G:
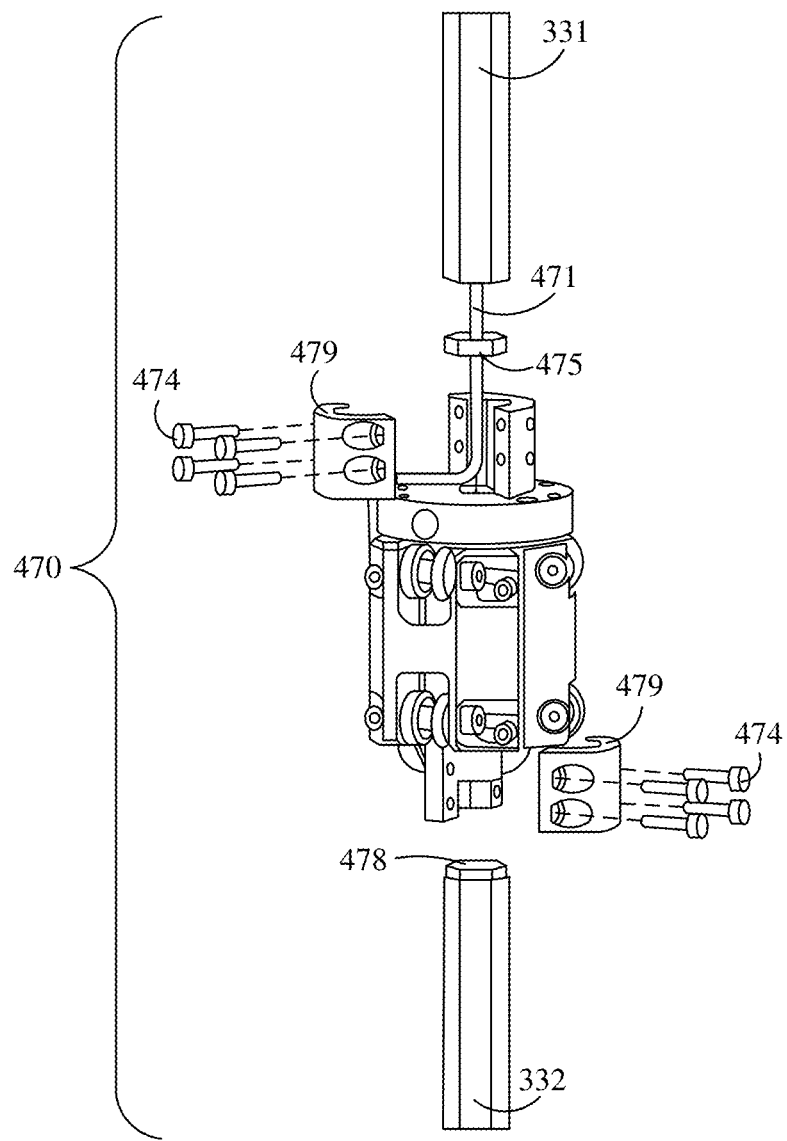
FIG. 4G shows an exploded view of some components of an example structural load cell case for a robotic system undergoing assembly, in accordance with one embodiment of the invention.

FIG. 4G shows an exploded view 470 of some components of an example structural load cell case 340 for a robotic system undergoing assembly, in accordance with one embodiment of the invention. In some embodiments, the user begins by cutting an upper shaft 331 and a lower shaft 332 to lengths appropriate for the application. Next, the user routes the sensor wire ("cable") 471 through the wire grommet 475 and the upper shaft 331. In some embodiments, a small zip tie (not shown) secures the cable 471 to the cable mount 472 (shown in FIG. 4H). The zip tie keeps the wire in place and provides strain-relief for the load cell 314. This is an easy solution without reimagining the geometry. The user applies pressure to the upper shaft 331 and lower shaft 332 and secures the shaft clamps 479 using screws 474. In some embodiments, the user applies a thread locker and torques the screws 474 sufficiently. The user applies pressure to the upper shaft 331 while tightening the upper shaft 331 collar screws 474. In some embodiments, the user adjusts the lengths of the upper shaft 331 and lower shaft 332 as needed.

Figure 4K:
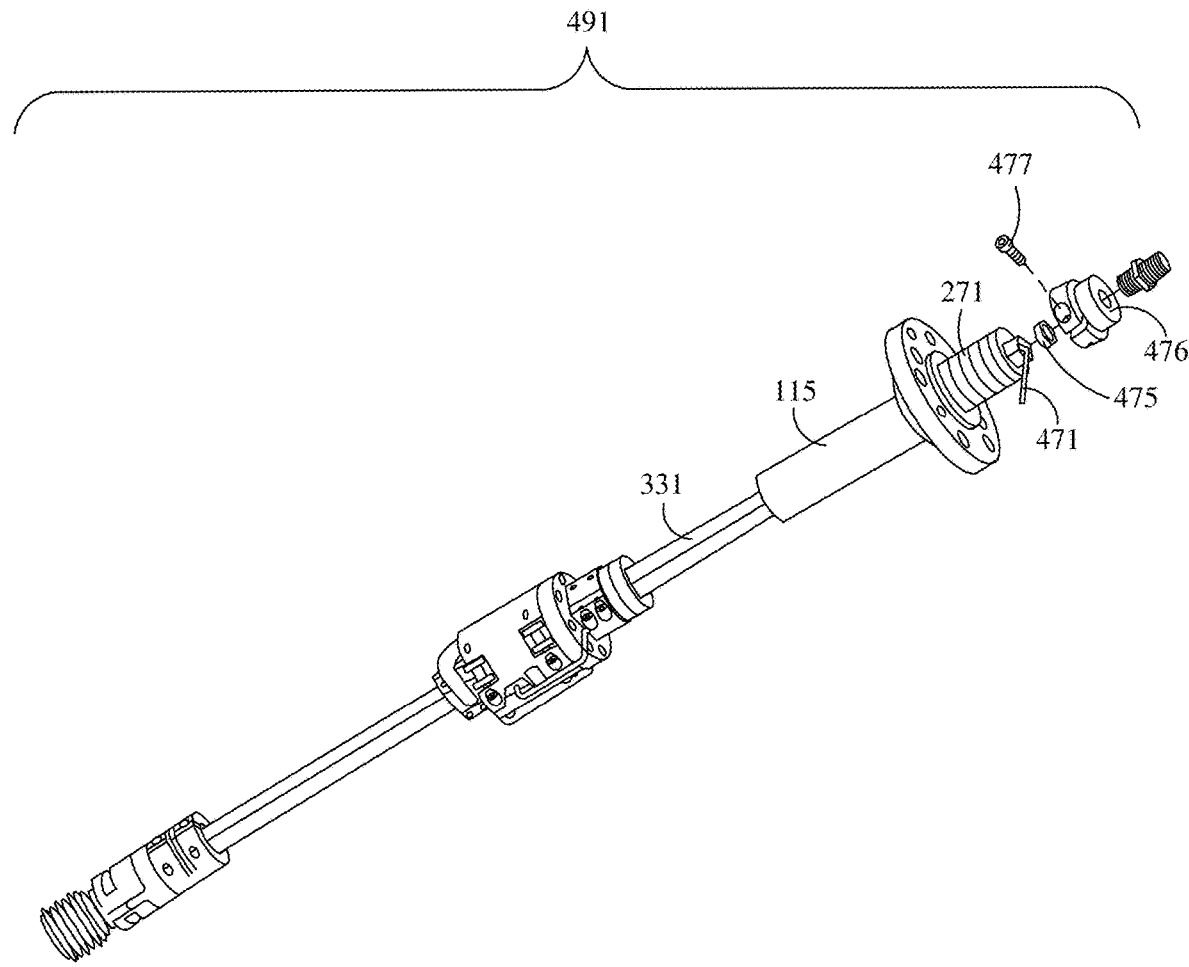
FIG. 4K shows an exploded view of some components including the end of the upper tube of an example structural load cell case for a robotic system undergoing assembly, in accordance with one embodiment of the invention.

At this point, the structural load cell case 340 is as shown in FIG. 4H, which shows an assembled view 480 of some components of an example structural load cell case 340 for a robotic system undergoing assembly, in accordance with one embodiment of the invention. FIG. 4J shows a cutaway view 490 of some components of an example structural load cell case 340 for a robotic system undergoing assembly, in accordance with one embodiment of the invention. FIG. 4K shows an exploded view 491 of some components including the end of the upper shaft 331 of an example structural load cell case 340 for a robotic system undergoing assembly, in accordance with one embodiment of the invention. With reference to FIG. 4K, the user then assembles soft washers 271 and tube body 115 onto the upper shaft 331. The user routes the sensor cable 471 through the wire grommet 475 and through the slit in the wire clamp 476. The user applies pressure to the wire clamp 476 and to the wire grommet 475, and secures the wire in place with a screw 477. The user torques the screw 477 sufficiently. The user may then install a tool changer and suction cup as needed. Finally, the user may attach an adapter fitting to the top of the tube as needed.

In some embodiments, the user may install an extension cable (not shown) on the robotic system to connect the load cell to a computer, leaving sufficient slack to avoid damaging the wire as the robotic arm moves.

Figure 4L:
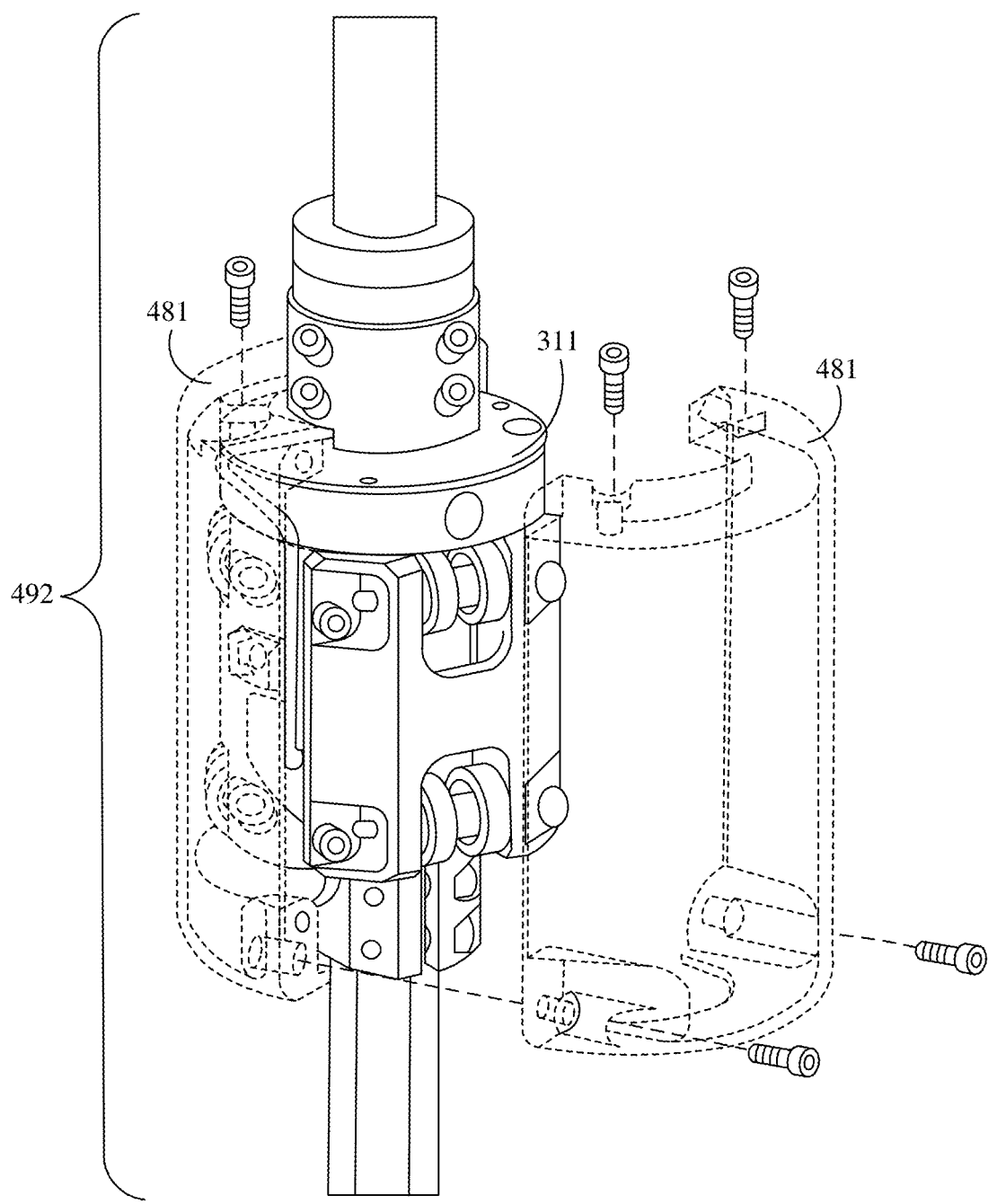
FIG. 4L shows an exploded view of an example structural load cell case for a robotic system where the dust cover is undergoing assembly, in accordance with one embodiment of the invention.

FIG. 4L shows an exploded view 492 of an example structural load cell case 340 for a robotic system where the dust cover 481 is undergoing assembly, in accordance with one embodiment of the invention. This view shows the two halves of the dust cover 481, which are fastened to the base 311, and to each other.

Figure 4M:
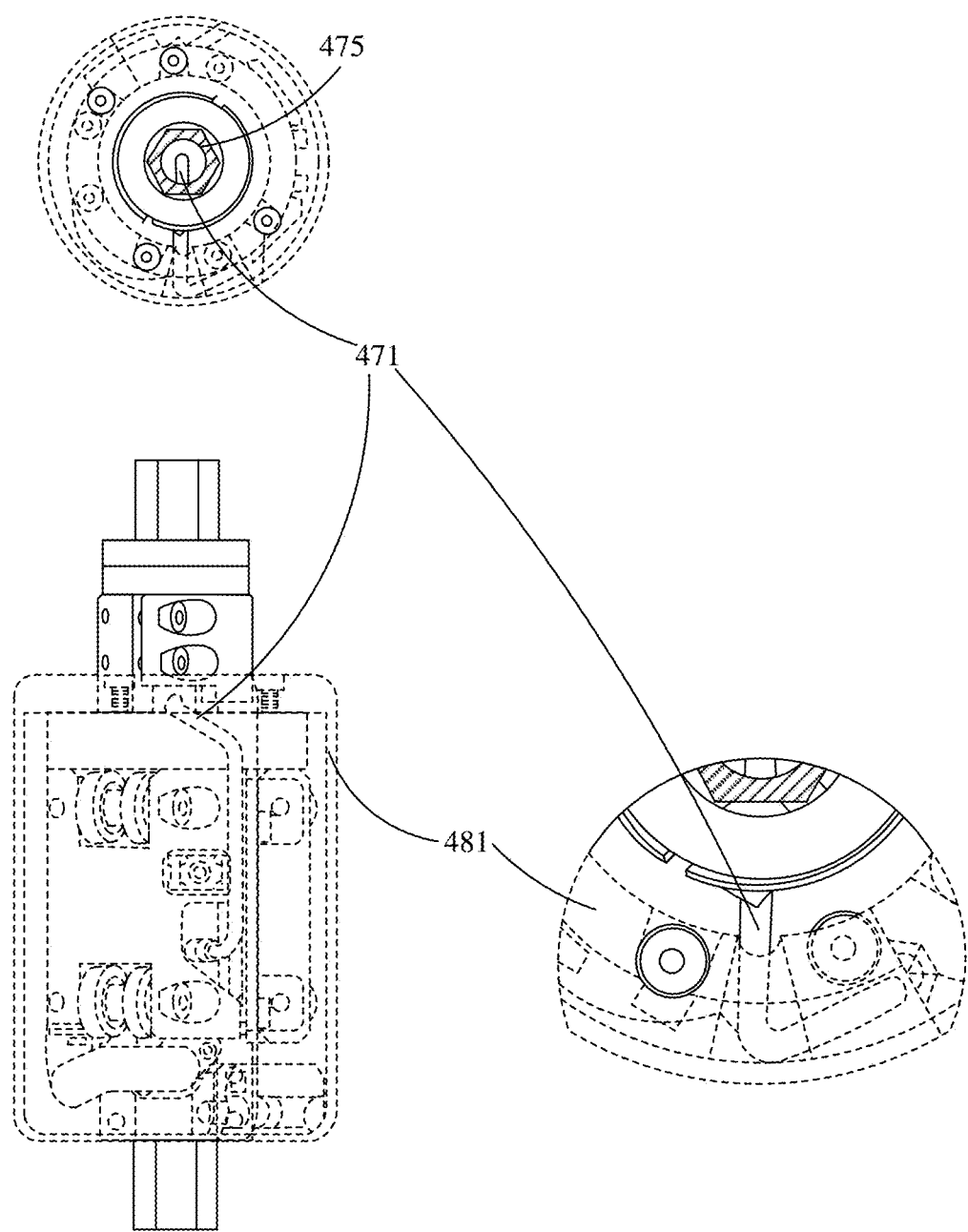
FIG. 4M shows an assembled view of some components of an example structural load cell case for a robotic system undergoing assembly, in accordance with one embodiment of the invention.

FIG. 4M shows an assembled view 493 of some components of an example structural load cell case 340 for a robotic system undergoing assembly, in accordance with one embodiment of the invention. The figure shows that the sensor wire 471 exits the dust cover 481 through a small indentation in the dust cover 481. The wire then routes through the upper tube via the wire grommet 475.

Figure 5:
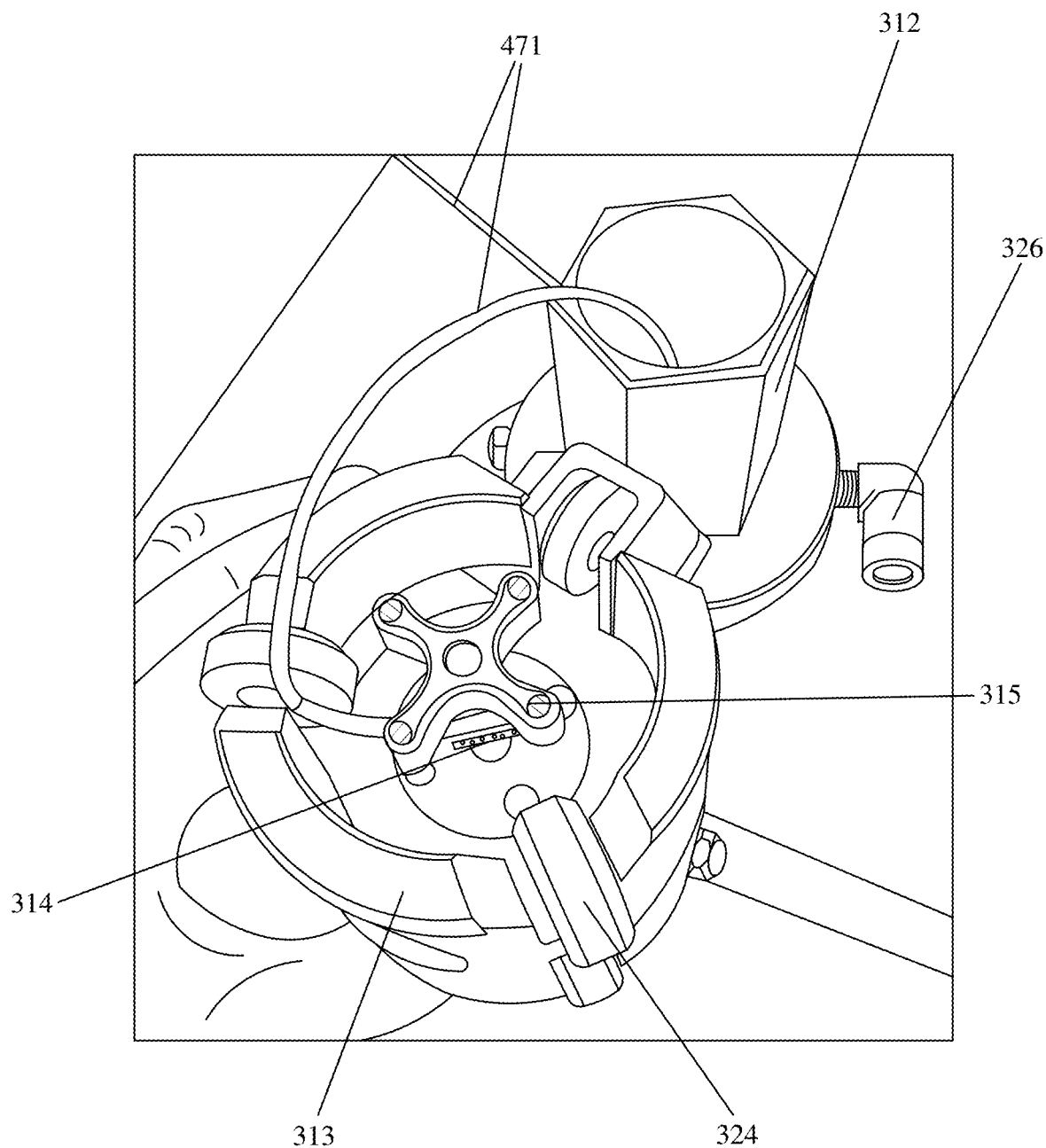
FIG. 5 shows an illustration of a disassembled example structural load cell case for a robotic system, in accordance with one embodiment of the invention.

FIG. 5 shows an illustration 500 of a disassembled example structural load cell case 340 for a robotic system, in accordance with one embodiment of the invention.

Experimental Data

Experiments on various structural load cell cases 340 with load cells 314, end effectors 114, and picked objects 103 were performed. In some embodiments, the specifications for the structural load cell case system are a load sensing range of 0.00-4.54 kg, and a measurement accuracy of ±5 g error (for static measurements). Because the sensor is off-the-shelf, larger capacity sensors may be used. This grants a larger measurement range, as well as a higher safe overload force. The downside is reduced accuracy in the measurements. In some embodiments, the force sensor is wired to a signal acquisition module, offboard from the robotic system. A signal amplifier reads an electrical signal from the force sensor and communicates the values to a computer (e.g., over TCP/IP) at a sufficiently high frequency (e.g., 500 Hz).

Figure 6A:
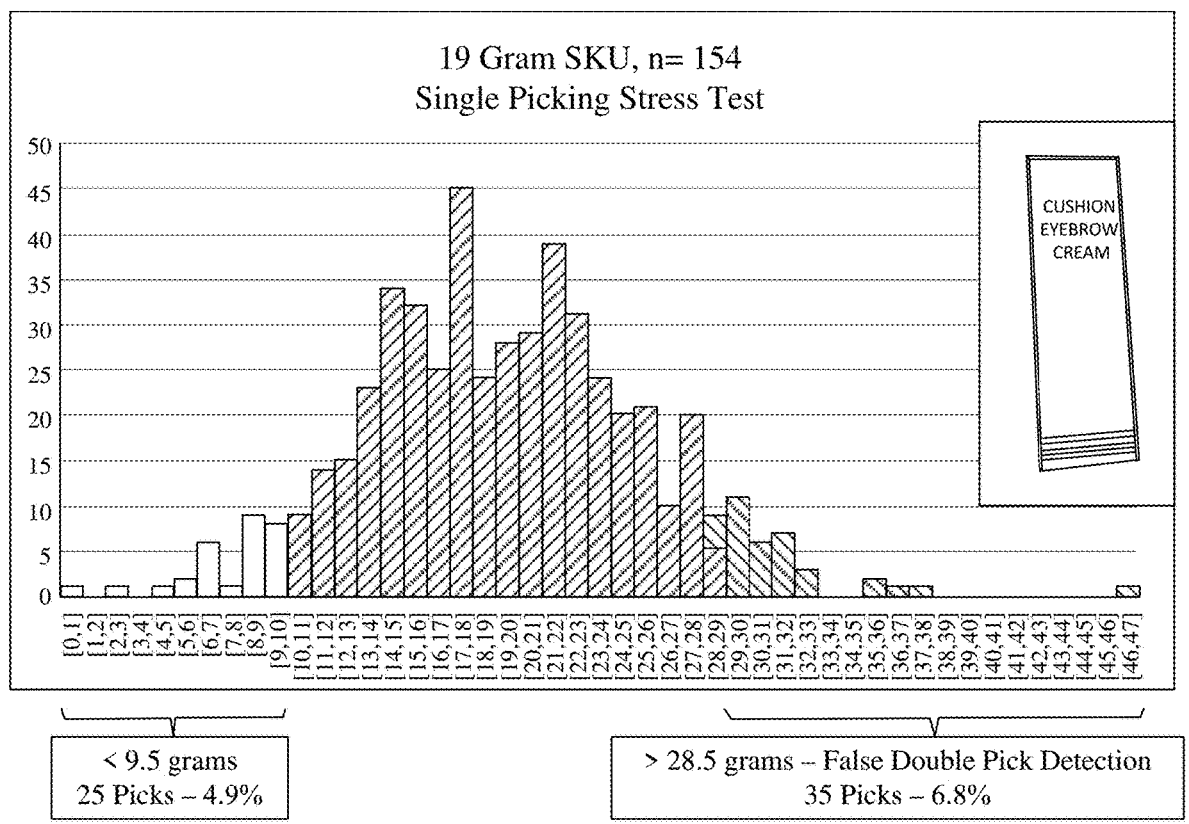
FIG. 6A shows a histogram of results from subjecting an example structural load cell case for a robotic system to a single picking stress test with a load of 19 g, in accordance with one embodiment of the invention.

FIG. 6A shows a histogram 610 of results from subjecting an example structural load cell case 340 for a robotic system to a single picking stress test with a load of 19 g, in accordance with one embodiment of the invention. In this experiment, a load of 19 g was picked 514 times by a robotic system with a structural load cell case 340 encasing a load cell 314 calibrated to measure the weight of the load. In 25 picks (4.9% of the total), the load cell 314 measured a weight of less of 9.5 g, or half of the actual weight of the load. In 35 picks (6.8% of the total), the load cell 314 measured a weight of more than 28.5 g, or 1.5 times the actual weight of the load, which results in a false detection of double picks.

Figure 6B:
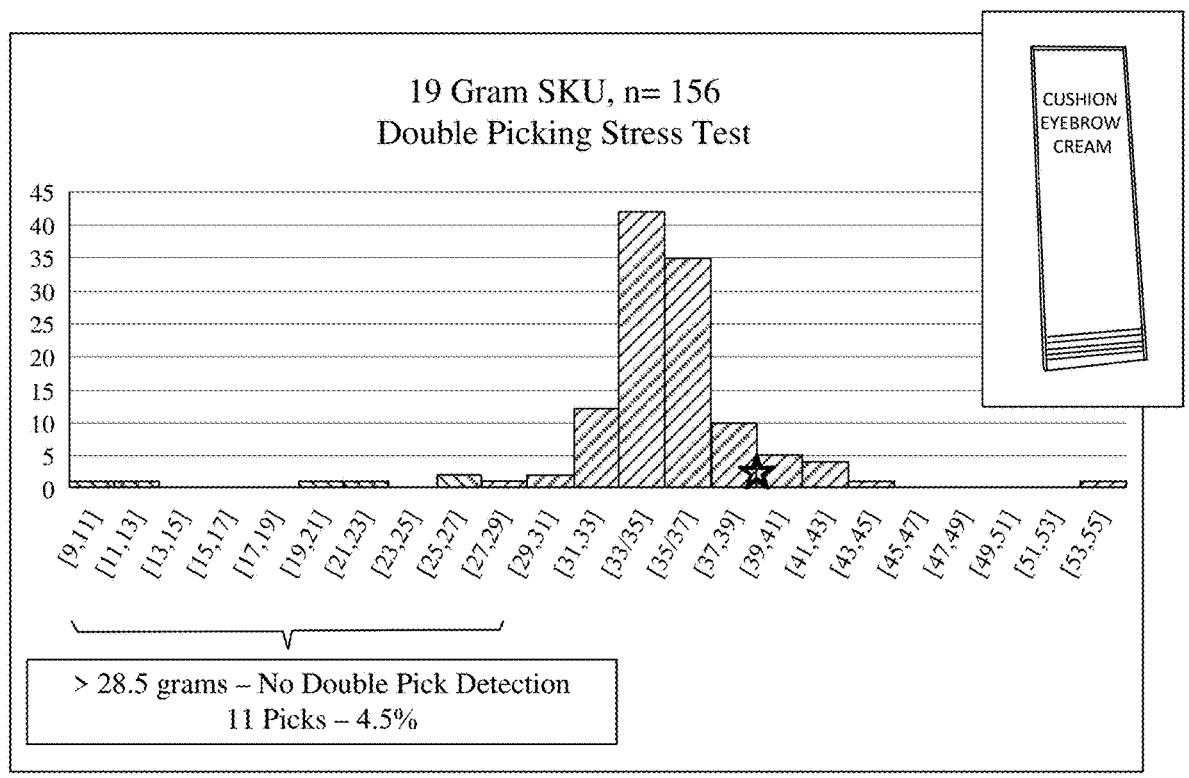
FIG. 6B shows a histogram of results from subjecting an example structural load cell case for a robotic system to a double picking stress test with a load of 19 g, in accordance with one embodiment of the invention.

FIG. 6B shows a histogram 620 of results from subjecting an example structural load cell case 340 for a robotic system to a double picking stress test with a load of 19 g, in accordance with one embodiment of the invention. In this experiment, a load comprising two identical objects of 19 g (38 g total) was picked 156 times by a robotic system with a structural load cell case 340 encasing a load cell 314 calibrated to measure the weight of the load. In 11 picks (4.5% of the total), the load cell 314 measured a weight of less of 28.5 g, or 1.5 times the actual weight of a single 19 g object, which results in a false detection of single picks.

Figure 6C:
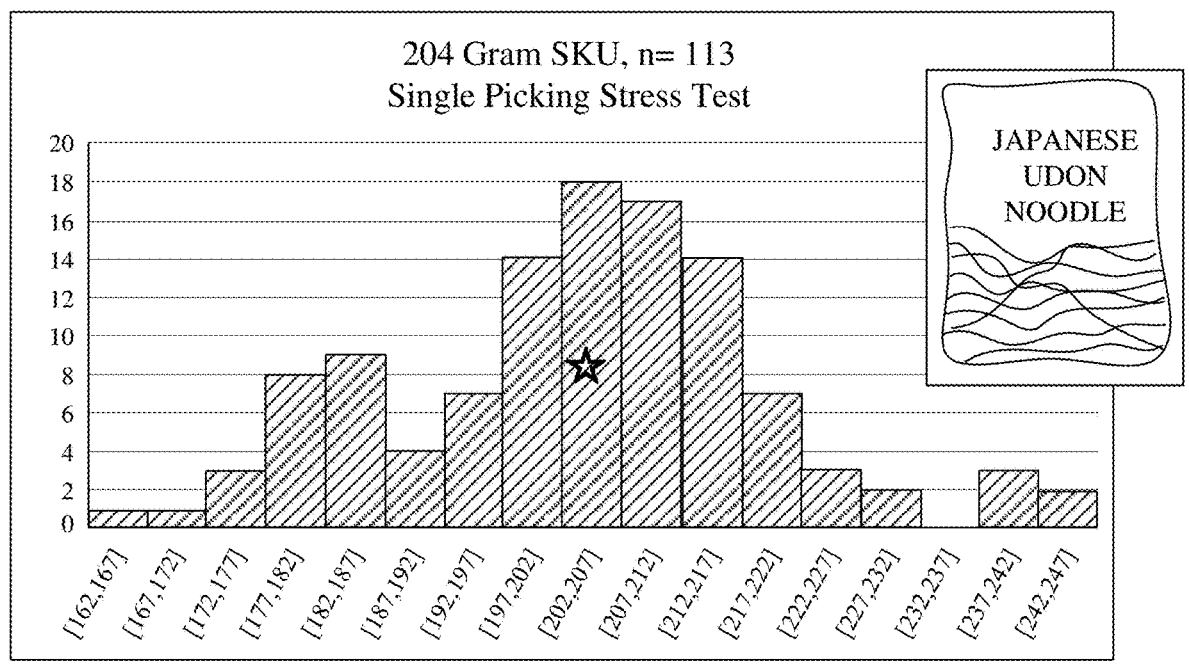
FIG. 6C shows a histogram of results from subjecting an example structural load cell case for a robotic system to a single picking stress test with a load of 204 g, in accordance with one embodiment of the invention.

FIG. 6C shows a histogram 630 of results from subjecting an example structural load cell case 340 for a robotic system to a single picking stress test with a load of 204 g, in accordance with one embodiment of the invention. In this experiment, a load of 204 g was picked 113 times by a robotic system with a structural load cell case 340 encasing a load cell 314 calibrated to measure the weight of the load.

Figure 6D:
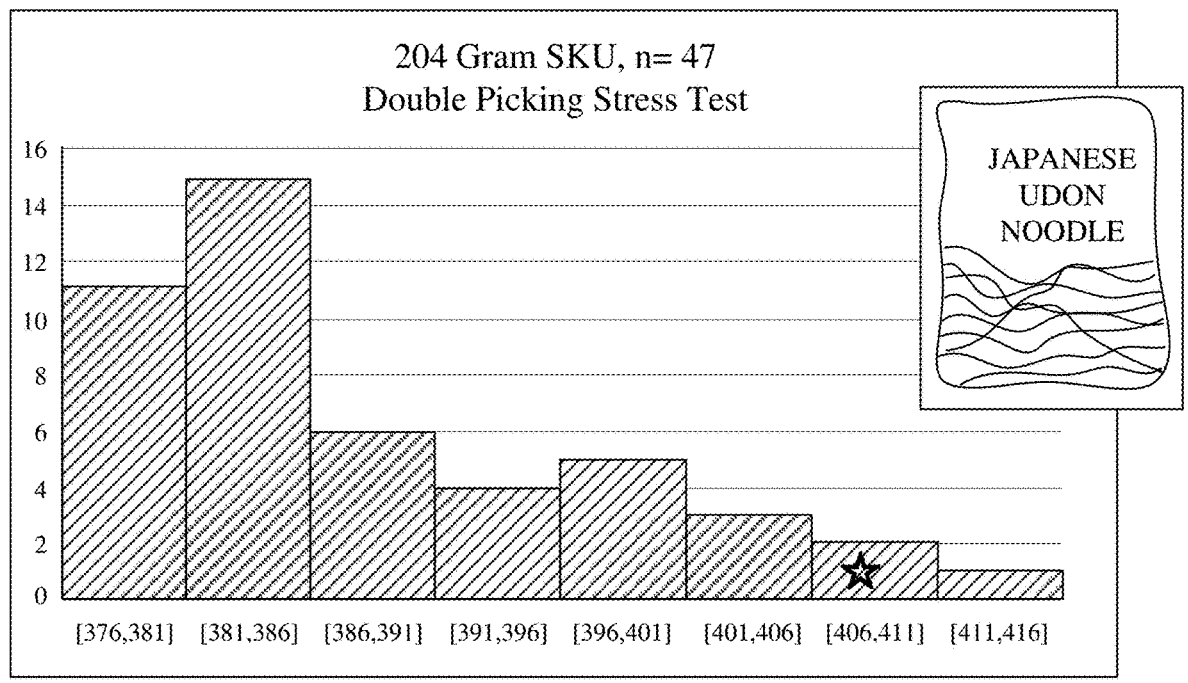
FIG. 6D shows a histogram of results from subjecting an example structural load cell case for a robotic system to a double picking stress test with a load of 204 g, in accordance with one embodiment of the invention.

FIG. 6D shows a histogram 640 of results from subjecting an example structural load cell case 340 for a robotic system to a double picking stress test with a load of 204 g, in accordance with one embodiment of the invention. In this experiment, a load comprising two identical objects of 204 g (408 g total) was picked 47 times by a robotic system with a structural load cell case 340 encasing a load cell 314 calibrated to measure the weight of the load.

Structural Load Cell Case in Operation

Figure 7A:
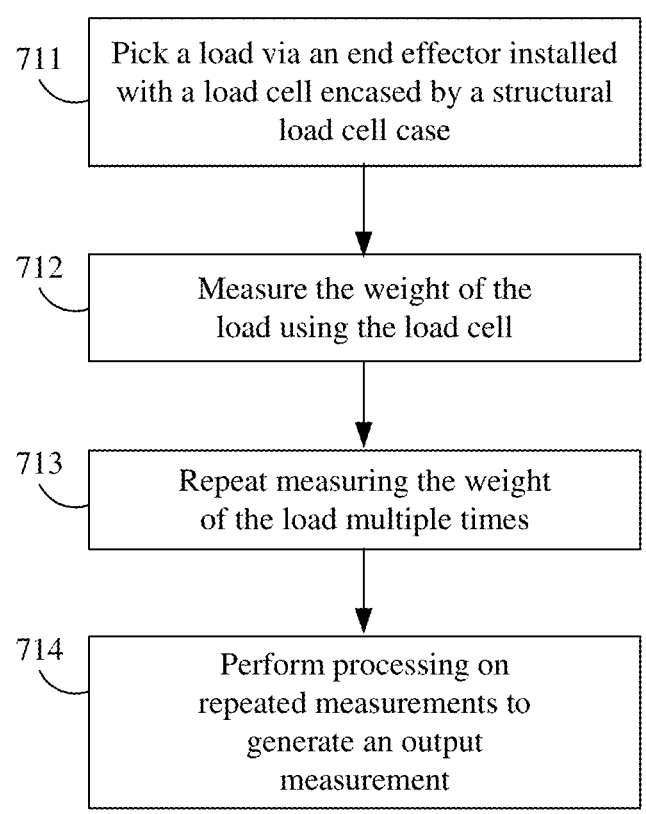
FIG. 7A shows an illustrative flow diagram for operating a structural load cell case for a robotic system, in accordance with one embodiment of the invention.

FIG. 7A shows an illustrative flow diagram 710 for operating a structural load cell case 340 for a robotic system, in accordance with one embodiment of the invention. Flow diagram 710 begins at step 711 by picking a load via a pick-and-place tool attached to a load cell 314 encased by a structural load cell case 340. The pick-and-place tool may be, for example, a gripper, a suction cup, or a magnetic tool. In step 712, the system measures the weight of the load using the load cell 314. In some embodiments, in step 713, multiple measurements are taken, and in step 714, some processing is performed on those repeated measurements to generate an output measurement. This may be used, for example, so that brief outlier measurements are ignored, or their influence reduced. In some embodiments, one such process is taking an average of the multiple measurements. In other embodiments, one such process is taking a median of the multiple measurements. In some embodiments, the average or the median is taken from a subset of the multiple measurements. This resulting output measurement is the weight measurement for the load.

Figure 7B:
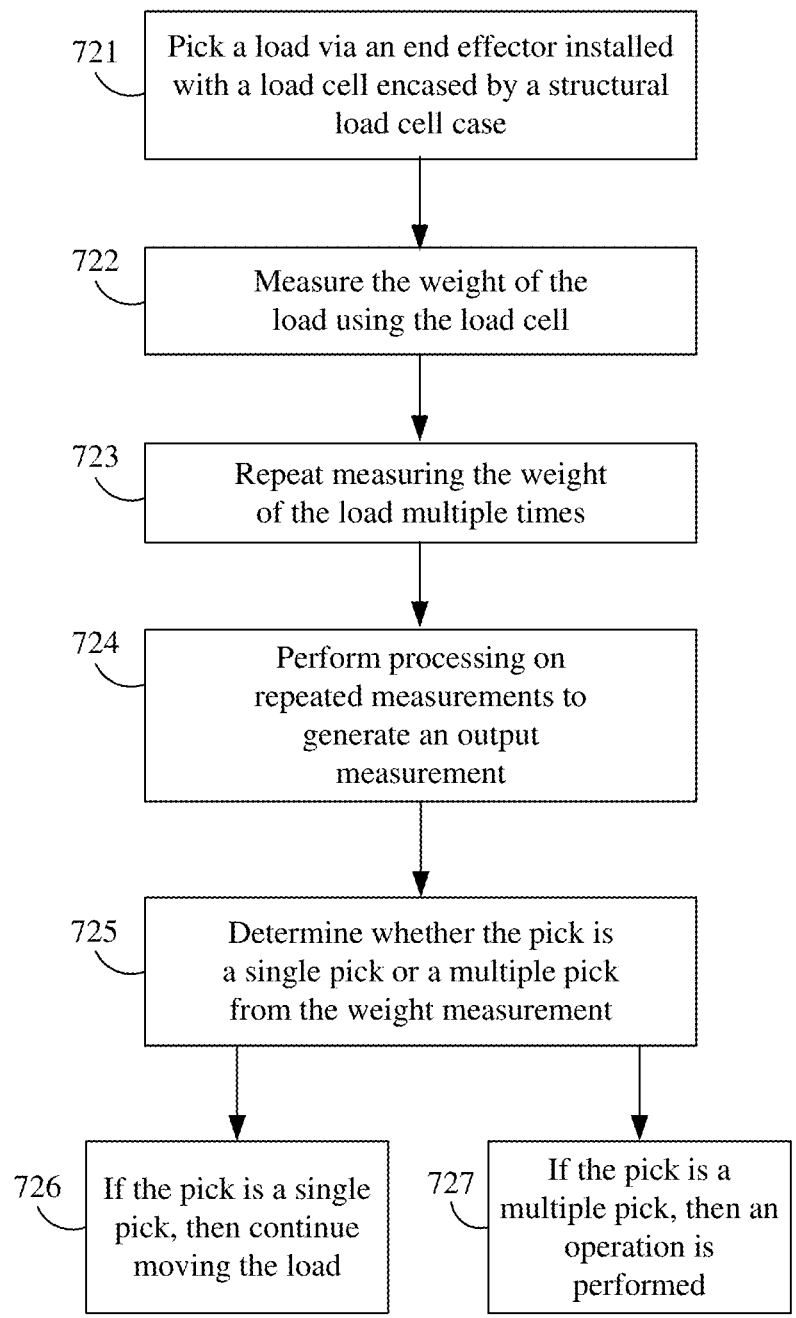
FIG. 7B shows an illustrative flow diagram for using a structural load cell case for a robotic system to detect multiple picking, in accordance with one embodiment of the invention.

FIG. 7B shows an illustrative flow diagram 720 for using a structural load cell case 340 for a robotic system to detect multiple picking, in accordance with one embodiment of the invention. Flow diagram 720 begins at step 721 by picking a load via a pick-and-place tool attached to a load cell 314 encased by a structural load cell case 340. The pick-and-place tool may be, for example, a gripper, a suction cup, or a magnetic tool. In step 722, the system measures the weight of the load using the load cell 314. In some embodiments, in step 723, multiple measurements are taken, and in step 724, some processing is performed on those repeated measurements to generate an output measurement. This may be used, for example, so that brief outlier measurements are ignored, or their influence reduced. In some embodiments, one such process is taking an average of the multiple measurements. In other embodiments, one such process is taking a median of the multiple measurements. In some embodiments, the average or the median is taken from a subset of the multiple measurements. This resulting output measurement is the weight measurement for the load.

In step 725, the system determines whether the pick is a single pick or a multiple pick from the weight measurement obtained from step 724. In step 726, if the pick is determined to be a single pick, then the system continues to move the load as planned. Finally, in step 727, if the pick is determined to be a multiple pick, then the system performs an operation. In some embodiments, this operation is replacing the pick. In other embodiments, this operation is to note that the pick is a multiple pick. In some embodiments, the multiple pick is a double pick.

Figure 7C:
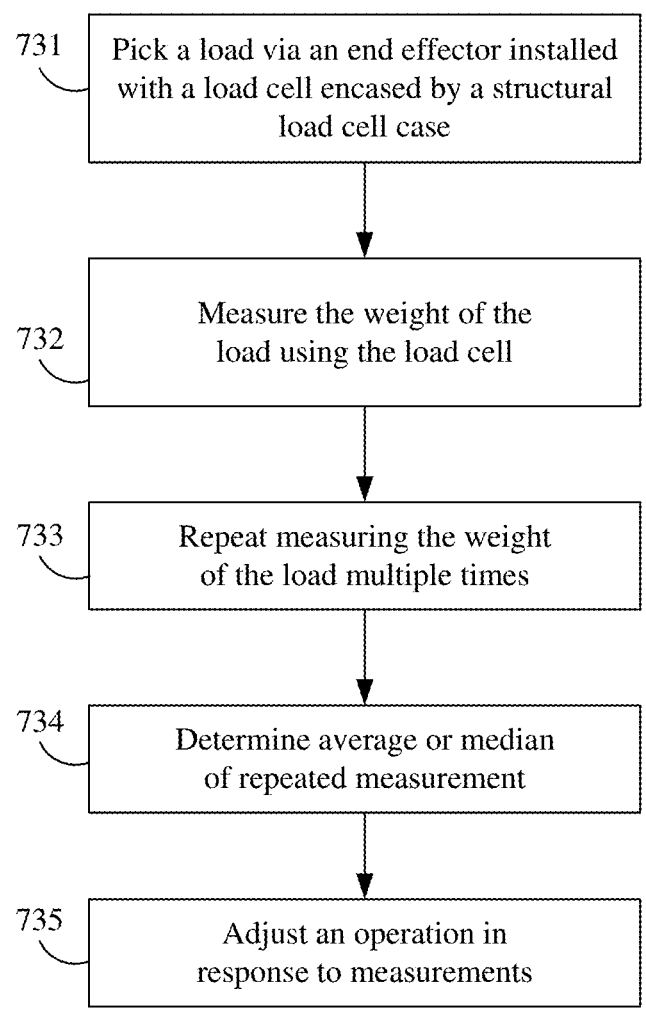
FIG. 7C shows an illustrative flow diagram for using a structural load cell case for a robotic system to adjust a system operation in response to load weight, in accordance with one embodiment of the invention.

FIG. 7C shows an illustrative flow diagram 730 for using a structural load cell case 340 for a robotic system to adjust system operation in response to load weight, in accordance with one embodiment of the invention. Flow diagram 730 begins at step 731 by picking a load via a pick-and-place tool attached to a load cell 314 encased by a structural load cell case 340. The pick-and-place tool may be, for example, a gripper, a suction cup, or a magnetic tool. In step 732, the system measures the weight of the load using the load cell 314. In some embodiments, in step 733, multiple measurements are taken, and in step 734, either the average or the median measurement is determined from those multiple measurements to generate a weight measurement for the load.

Finally, in step 735, the system adjusts an operation in response to the weight measurement obtained from step 734. In some embodiments, the adjustment is to replace the load because it has been determined to be too heavy for the pick-and-place tool or other components of the system. In other embodiments, the adjustment is to determine where to place the load. In other embodiments, the adjustment is to replace the pick-and-place tool. In other embodiments, the adjustment is to modify the maximum acceleration with which a component of the robotic system is commanded to move while handling the object. In other embodiments, the adjustment is to note or record the weight measurement. In a "gentle picking" mode, the record of the weight measurement is used to monitor the measured force that the end of any arm tooling exerts on the load or environment, a mode that may be used for picking fragile or delicate objects. In other embodiments, the adjustment is to control the force exerted on the load or environment. Such control may be useful for manufacturing processes, e.g., grinding and insertion, or for manipulation operations, e.g., pushing, pulling, or toppling.

Figure 7D:
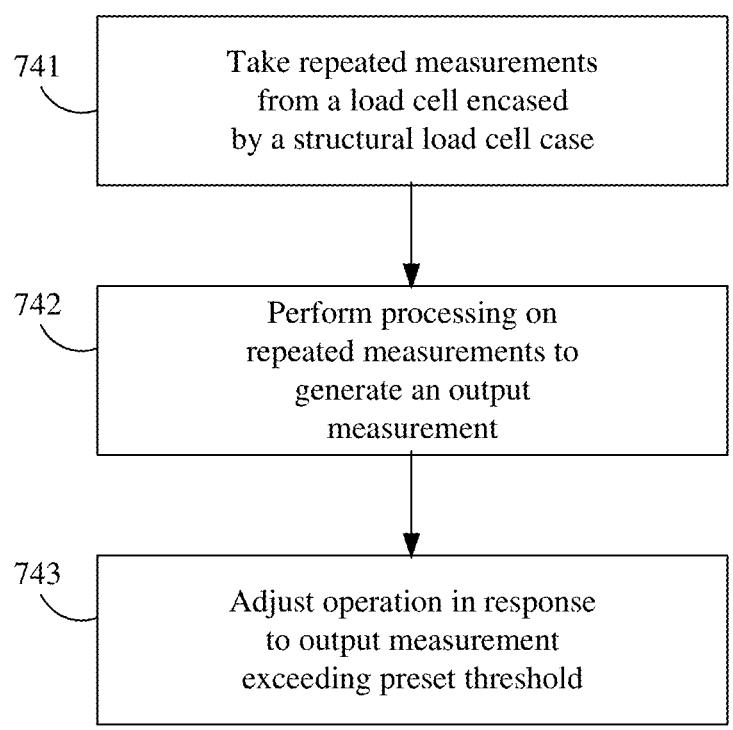
FIG. 7D shows an illustrative flow diagram for using a structural load cell case for a robotic system as a limit switch, in accordance with one embodiment of the invention.

FIG. 7D shows an illustrative flow diagram 740 for using a structural load cell case 340 for a robotic system as a limit switch, in accordance with one embodiment of the invention. Flow diagram 740 begins at step 741 by taking repeated measurements from a load cell 314 encased by a structural load cell case 340. Such an operation may, for example, be used to detect whether there is a non-negligible force acting on the load cell 314. In step 742, some processing is performed on those repeated measurements to generate an output measurement. This may be used, for example, so that brief outlier measurements are ignored or their influence reduced. In some embodiments, one such process is taking an average of measurements across a period of time. In other embodiments, one such process is taking a median of measurements across a period of time. In some embodiments, the average or the median is taken from a subset of measurements across a period of time. Finally, in step 743, the system adjusts an operation in response to the output measurement obtained from step 742 exceeding a preset threshold. Exceeding the preset threshold is the triggering of a limit switch implemented in accordance with flow diagram 740. The operation adjustment may be, for example, the halting of an operation. Flow diagram 740 may be modified for use in operations such as for maintaining a pull or push force during an assembly of parts. For example, the force measurements may be monitored at specified time intervals, and the end effector's motion is adjusted based on whether the force measurements fall outside a pre-determined target range of values or based on how much the force measurements deviate from a pre-determined target value. The robotic system may employ a feedback control mechanism to maintain such a pull or push force. Furthermore, the structural load cell case protects the load cell from side forces during such an operation.

Figure 7E:
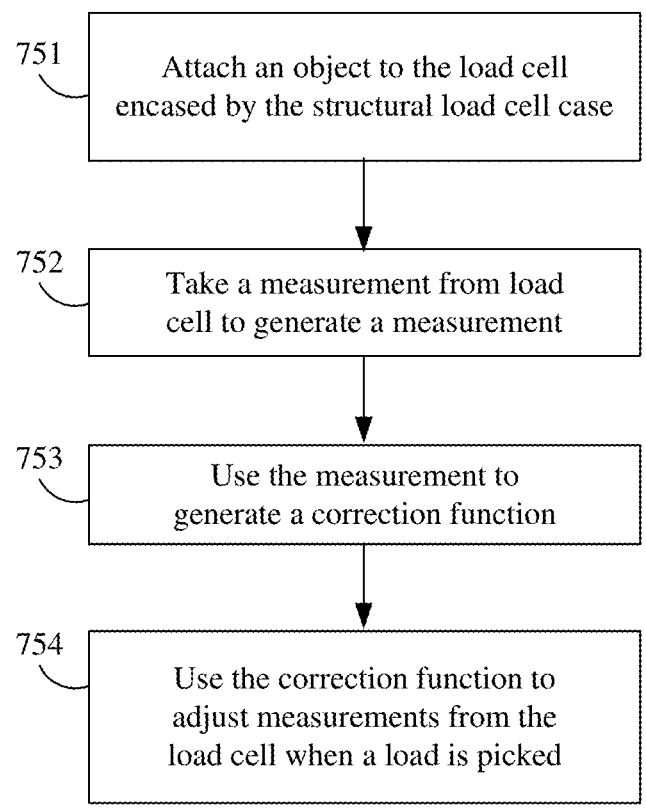
FIG. 7E shows an illustrative flow diagram for using a structural load cell case for a robotic system to calibrate load cell measurements, in accordance with one embodiment of the invention.

FIG. 7E shows an illustrative flow diagram 750 for using a structural load cell case 340 for a robotic system to calibrate load cell 314 measurements, in accordance with one embodiment of the invention. Such a calibration method may be used, for example, to correct any load cell 314 measurements by accounting for any offsets and/or scaling due to various factors, such as wiring or the structural load cell case 340 itself. Flow diagram 750 begins at step 751 by attaching an object to the load cell 314 encased by the structural load cell case 340, where the weight of the object is known. In some embodiments, the object is the end of arm tools. In such embodiments, the system may tool change to a new tool and use the known weight of the new tool for calibrating measurements of loads picked by the new tool. In step 752, the system takes a measurement from the load cell 314 to generate a measurement. In some embodiments, steps 751 and 752 are repeated for a plurality of objects of known weights to generate a plurality of measurements. In step 753, the system uses the measurement or the plurality of measurements to generate a correction function. Finally, in step 754, the system uses the correction function to adjust measurements from the load cell 314 when a load is picked via a pick-and-place tool attached to the load cell 314.

Figure 7F:
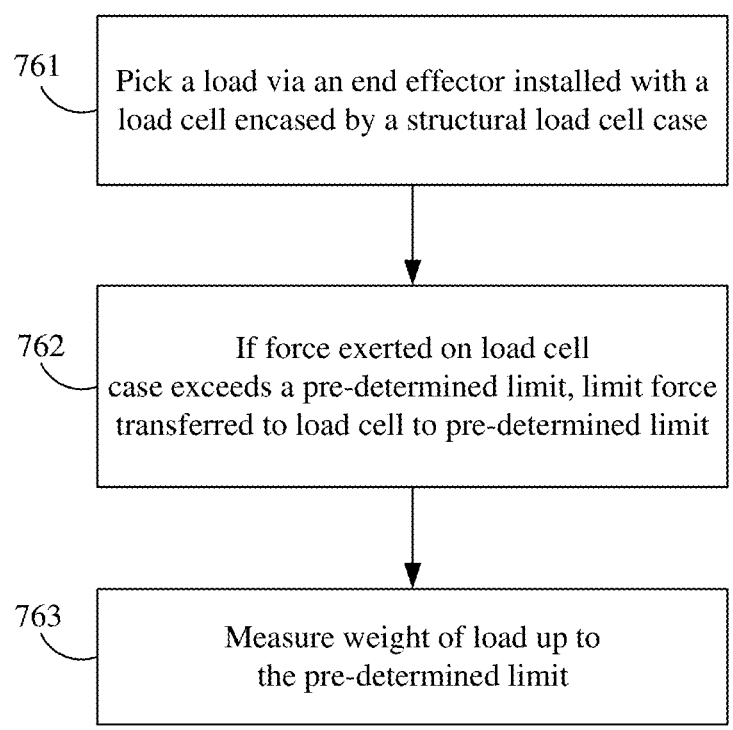
FIG. 7F shows an illustrative flow diagram for operating a structural load cell case for a robotic system that limits the maximum positive force measured, in accordance with one embodiment of the invention.

FIG. 7F shows an illustrative flow diagram 760 for operating a structural load cell case 340 for a robotic system that limits the maximum positive force measured, in accordance with one embodiment of the invention. Flow diagram 760 begins at step 761 by picking a load via a pick-and-place tool attached to a load cell 314 encased by a structural load cell case 340. The pick-and-place tool may be, for example, a gripper, a suction cup, or a magnetic tool. In step 762, if the force exerted on the structural load cell case 340 exceeds a pre-determined limit, the structural load cell case 340 limits the force transferred to the load cell 314 to the pre-determined limit. In step 763, the system measures the weight of the load using the load cell 314 up to the pre-determined limit. The method described by flow diagram 760 may be modified to similarly limit the maximum negative force measured, e.g., the structural load cell case 340 is pushed instead of pulled. The method described by flow diagram 760 may be combined with any of the aforementioned methods in ways apparent to those skills in the art.

Figure 7G:
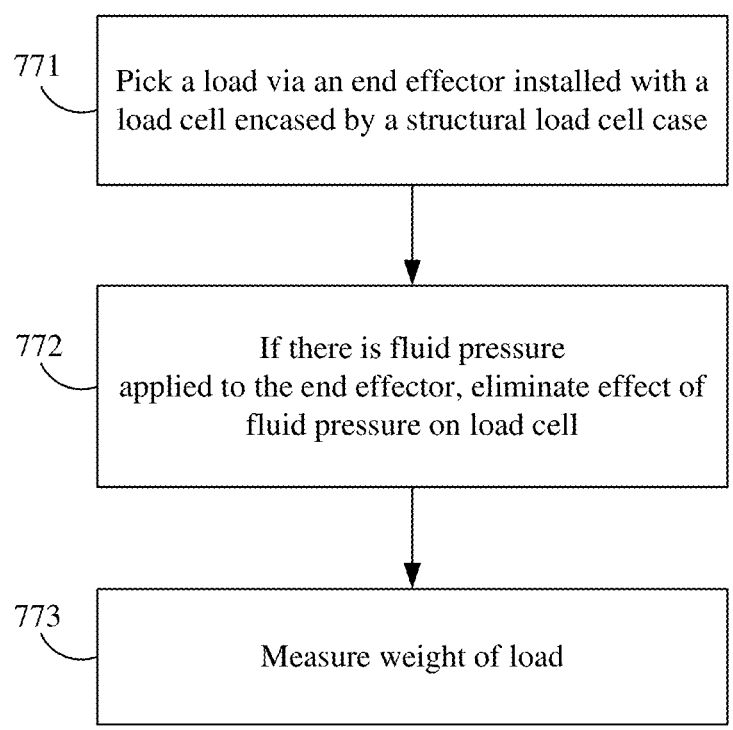
FIG. 7G shows an illustrative flow diagram for operating a structural load cell case for a robotic system that eliminates the effect of fluid pressure applied to the end effector on the load cell measurement, in accordance with one embodiment of the invention.

FIG. 7G shows an illustrative flow diagram 770 for operating a structural load cell case 340 for a robotic system that eliminates the effect of fluid pressure applied to a pick-and-place tool on the load cell 314 measurement, in accordance with one embodiment of the invention. Flow diagram 770 begins at step 771 by picking a load via a pick-and-place tool attached to a load cell 314 encased by a structural load cell case 340. The pick-and-place tool may be, for example, a gripper, a suction cup, or a magnetic tool. In step 772, if there is fluid pressure (e.g., a positive pressure from compressed air, a negative pressure from a vacuum) applied to the pick-and-place tool, the structural load cell case 340 eliminates the effect of that fluid pressure on the load cell 314. In step 773, the system measures the weight of the load using the load cell 314. The method described by flow diagram 770 may be combined with any of the aforementioned methods in ways apparent to those skills in the art.

Implementation Using Computer Program Products, Methods, and Computing Entities

The present invention may be implemented in a combination of hardware and/or software. An illustrative hardware and software operational environment for implementing one embodiment of the present invention is now described.

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that includes combination of computer program products and hardware performing certain steps or operations.

Embodiments of the present disclosure are described with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

An exemplary embodiment of the present disclosure may include one or more servers (management computing entities), one or more networks, and one or more clients (user computing entities). Each of these components, entities, devices, systems, and similar words used herein interchangeably may be in direct or indirect communication with, for example, one another over the same or different wired or wireless networks. Additionally, while FIGS. 8 and 9 illustrate the various system entities as separate, stand-alone entities, the various embodiments are not limited to this particular architecture.

Exemplary Management Computing Entity

Figure 8:
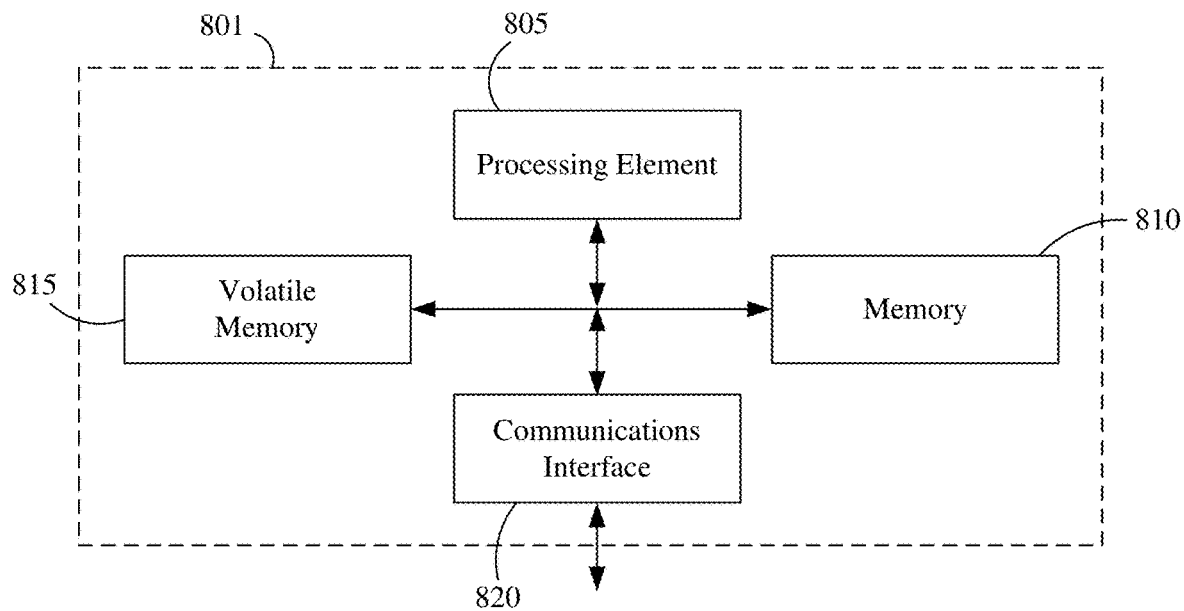
FIG. 8 provides a schematic of a server (management computing entity) according to one embodiment of the present disclosure.
Figure 9:
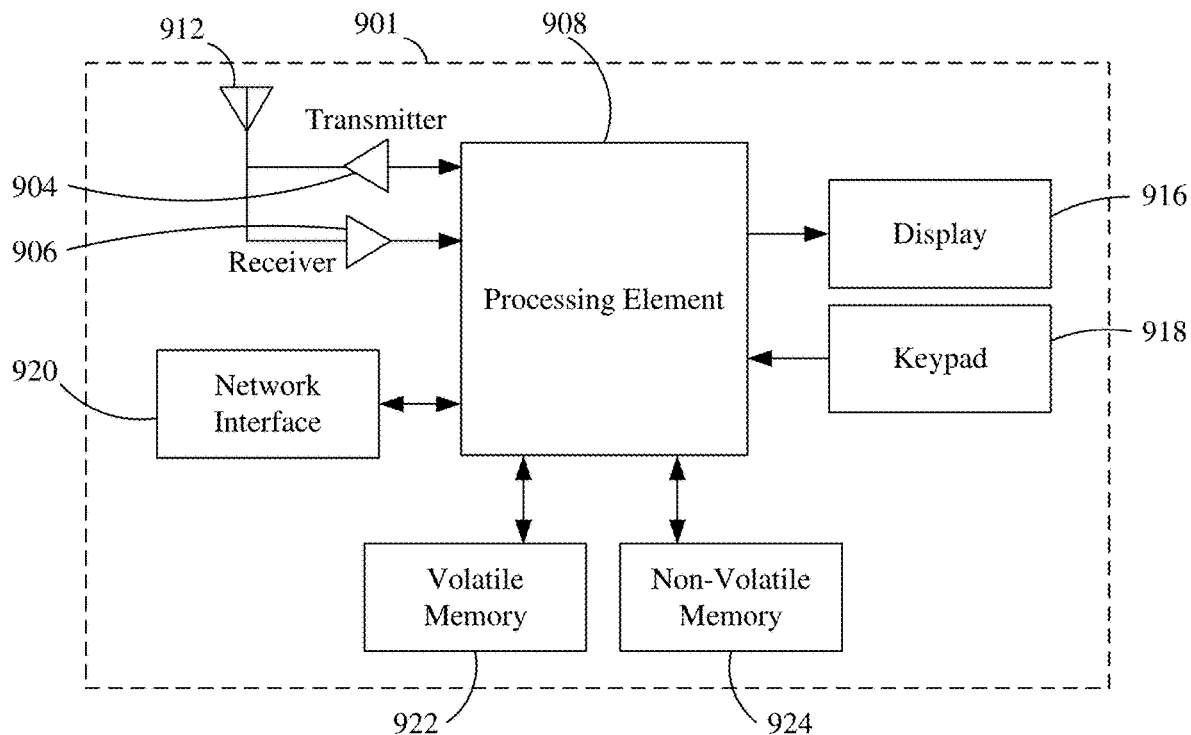
FIG. 9 provides an illustrative schematic representative of a client (user computing entity) that can be used in conjunction with embodiments of the present disclosure.

FIG. 8 provides a schematic of a server (management computing entity) 801 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 801 may also include one or more communications interfaces 820 for communicating with various computing entities, such as by communicating data, content, information, and/or similar terms used herein interchangeably that can be transmitted, received, operated on, processed, displayed, stored, and/or the like.

As shown in FIG. 8, in one embodiment, the management computing entity 801 may include or be in communication with one or more processing elements 805 (also referred to as processors, processing circuitry, and/or similar terms used herein interchangeably) that communicate with other elements within the management computing entity 801 via a bus, for example. As will be understood, the processing element 805 may be embodied in a number of different ways. For example, the processing element 805 may be embodied as one or more complex programmable logic devices (CPLDs), microprocessors, multi-core processors, coprocessing entities, application-specific instruction-set processors (ASIPs), microcontrollers, and/or controllers. Further, the processing element 805 may be embodied as one or more other processing devices or circuitry. The term circuitry may refer to an entirely hardware embodiment or a combination of hardware and computer program products. Thus, the processing element 805 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 805 may be configured for a particular use or configured to execute instructions stored in volatile or non-volatile media or otherwise accessible to the processing element 805. As such, whether configured by hardware or computer program products, or by a combination thereof, the processing element 805 may be capable of performing steps or operations according to embodiments of the present disclosure when configured accordingly.

In one embodiment, the management computing entity 801 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 810, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 801 may further include or be in communication with volatile media (also referred to as volatile storage, memory, memory storage, memory circuitry and/or similar terms used herein interchangeably). In one embodiment, the volatile storage or memory may also include one or more volatile storage or memory media 815, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 805. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 801 with the assistance of the processing element 805 and operating system.

As indicated, in one embodiment, the management computing entity 801 may also include one or more communications interfaces 820 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 801 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 801 may include or be in communication with one or more input elements, such as a keyboard input, a mouse input, a touch screen/display input, motion input, movement input, audio input, pointing device input, joystick input, keypad input, and/or the like. The management computing entity 801 may also include or be in communication with one or more output elements (not shown), such as audio output, video output, screen/display output, motion output, movement output, and/or the like.

As will be appreciated, one or more of the components of the management computing entity 801 may be located remotely from other management computing entity 801 components, such as in a distributed system. Furthermore, one or more of the components may be combined and additional components performing functions described herein may be included in the management computing entity 801. Thus, the management computing entity 801 can be adapted to accommodate a variety of needs and circumstances. As will be recognized, these architectures and descriptions are provided for exemplary purposes only and are not limiting to the various embodiments.

Exemplary User Computing Entity

A user may be an individual, a company, an organization, an entity, a department within an organization, a representative of an organization and/or person, and/or the like. FIG. 9 provides an illustrative schematic representative of a client (user computing entity) 901 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 901 can be operated by various parties. As shown in FIG. 9, the user computing entity 901 can include an antenna 912, a transmitter 904 (e.g., radio), a receiver 906 (e.g., radio), and a processing element 908 (e.g., CPLDs, microprocessors, multi-core processors, coprocessing entities, ASIPs, microcontrollers, and/or controllers) that provides signals to and receives signals from the transmitter 904 and receiver 906, respectively.

The signals provided to and received from the transmitter 904 and the receiver 906, respectively, may include signaling information in accordance with air interface standards of applicable wireless systems. In this regard, the user computing entity 901 may be capable of operating with one or more air interface standards, communication protocols, modulation types, and access types. More particularly, the user computing entity 901 may operate in accordance with any of a number of wireless communication standards and protocols, such as those described above with regard to the management computing entity 801. In a particular embodiment, the user computing entity 901 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 901 may operate in accordance with multiple wired communication standards and protocols, such as those described above with regard to the management computing entity 801 via a network interface 920.

Via these communication standards and protocols, the user computing entity 901 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 901 can also download changes, add-ons, and updates, for instance, to its firmware, software (e.g., including executable instructions, applications, program modules), and operating system.

According to one embodiment, the user computing entity 901 may include location determining aspects, devices, modules, functionalities, and/or similar words used herein interchangeably. For example, the user computing entity 901 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's 901 position in connection with a variety of other systems, including cellular towers, Wi-Fi access points, and/or the like. Similarly, the user computing entity 901 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 901 may also comprise a user interface (that can include a display 916 coupled to a processing element 908) and/or a user input interface (coupled to a processing element 908). For example, the user interface may be a user application, browser, user interface, and/or similar words used herein interchangeably executing on and/or accessible via the user computing entity 901 to interact with and/or cause display of information from the management computing entity 801, as described herein. The user input interface can comprise any of a number of devices or interfaces allowing the user computing entity 901 to receive data, such as a keypad 918 (hard or soft), a touch display, voice/speech or motion interfaces, or other input device. In embodiments including a keypad 918, the keypad 918 can include (or cause display of) the conventional numeric (0-9) and related keys (#, *), and other keys used for operating the user computing entity 901 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 901 can also include volatile storage or memory 922 and/or non-volatile storage or memory 924, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 901. As indicated, this may include a user application that is resident on the entity or accessible through a browser or other user interface for communicating with the management computing entity 801 and/or various other computing entities.

In another embodiment, the user computing entity 901 may include one or more components or functionality that are the same or similar to those of the management computing entity 801, as described in greater detail above. As will be recognized, these architectures and descriptions are provided for exemplary purposes only and are not limiting to the various embodiments.

Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module, or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks, which include Compact Disk Read-Only Memory (CD ROMS), Digital Versatile Disks (DVDs), etc., as well as digital and analog communication media.

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap to practice the methods of the present invention.

CONCLUSIONS

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A structural load cell case for a robotic system to encase a load cell, the load cell adapted for measuring a force along a force axis, the structural load cell case comprising:
   a base adapted to connect to a load at a distal end of the force axis, the base comprising a flexible joint connected with a first part of the load cell;
   an inner tube along the force axis that houses the load cell; and
   a roller sleeve along the force axis and outside the inner tube, the roller sleeve comprising a plurality of roller bearings in contact with the inner tube,
   wherein the inner tube is adapted to slide along the force axis, and
   wherein the inner tube is constrained from rotating or translating in directions other than the force axis.

2. The structural load cell case of claim 1, wherein the flexible joint is a compression spring.

3. The structural load cell case of claim 1, wherein the inner tube further comprises:
    an adapter plate to secure a second part of the load cell to the inner tube.

4. The structural load cell case of claim 1, further comprising:
    a plurality of pneumatic fittings and an external flexible tube,
    wherein a first pneumatic fitting of the plurality of pneumatic fittings connects the inner tube to a top tube;
    wherein the first pneumatic fitting channels to a second pneumatic fitting of the plurality of pneumatic fittings on the inner tube via the built-in air channel, which connects to a first end of the external flexible tube;
    wherein a second end of the external flexible tube connects to a third pneumatic fitting of the plurality of pneumatic fittings on the base;
    wherein the third pneumatic fitting channels to a fourth pneumatic fitting of the plurality of pneumatic fittings; and
    wherein the fourth pneumatic fitting connects the base to a bottom tube.

5. The structural load cell case of claim 1, wherein the inner tube comprises a built-in air channel adapted for carrying a fluid.

6. The structural load cell case of claim 5, further comprising:
    an internal air channel fluidly connected to the built-in air channel; and
    a flexible air fitting fluidly connected to the internal air channel.

7. The structural load cell case of claim 5, wherein the inner tube further comprises:
    a manifold plate that houses the built-in air channel.

8. The structural load cell case of claim 1, wherein the inner tube has a non-circular cross-sectional shape.

9. The structural load cell case of claim 8, wherein the non-circular cross-sectional shape is a hexagon.

10. The structural load cell case of claim 1, wherein the plurality of roller bearings slide along a wall of the inner tube.

11. The structural load cell case of claim 10, further comprising:
    a spacer between a pair of the plurality of roller bearings on a shared shoulder.

12. The structural load cell case of claim 1, wherein the roller sleeve further comprises a wheel bracket.

13. The structural load cell case of claim 1, wherein a subset of the plurality of roller bearings roll together and are on a shared shoulder screw affixed to the roller sleeve.

14. The structural load cell case of claim 1, wherein the structural load cell case limits a force transferred to the load cell to a pre-determined limit.

15. A robotic system comprising a structural load cell case to encase a load cell, the load cell adapted for measuring a force along a force axis, the structural load cell case comprising:
    a base adapted to connect to a load at a distal end of the force axis, the base comprising a flexible joint connected with a first part of the load cell;
    an inner tube along the force axis that houses the load cell; and
    a roller sleeve along the force axis and outside the inner tube, the roller sleeve comprising a plurality of roller bearings in contact with the inner tube,
    wherein the inner tube is adapted to slide along the force axis, and
    wherein the inner tube is constrained from rotating or translating in directions other than the force axis.

16. The robotic system of claim 15, wherein the flexible joint is a compression spring.

17. The robotic system of claim 15, wherein the inner tube further comprises:
    an adapter plate to secure a second part of the load cell to the inner tube.

18. The structural load cell case of claim 15, wherein the inner tube comprises a built-in air channel adapted for carrying a fluid.

19. The robotic system of claim 18, further comprising:
    an internal air channel fluidly connected to the built-in air channel; and
    a flexible air fitting fluidly connected to the internal air channel.

20. The robotic system of claim 18, wherein the inner tube further comprises:
    a manifold plate that houses the built-in air channel.

* * * * *